Jan. 13, 1948.   R. E. PAGE ET AL   2,434,512
RECORD CONTROLLED DISTRIBUTING AND ACCOUNTING MACHINE
Filed Dec. 31, 1943   12 Sheets-Sheet 1
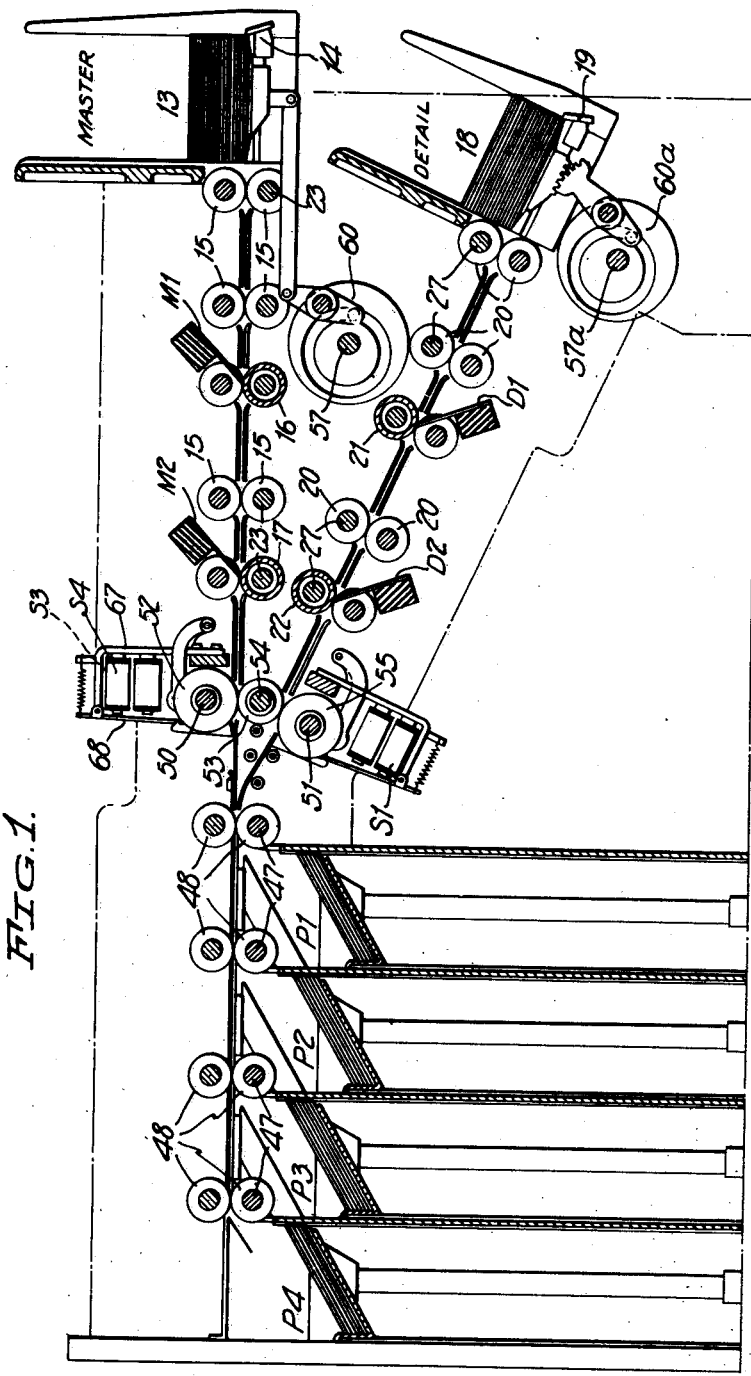
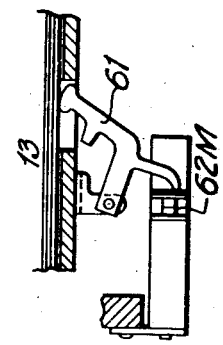
INVENTORS
RALPH E. PAGE
HORACE S. BEATTIE
BY
ATTORNEY Jan. 13, 1948.  R. E. PAGE ET AL  2,434,512
RECORD CONTROLLED DISTRIBUTING AND ACCOUNTING MACHINE
Filed Dec. 31, 1943  12 Sheets-Sheet 2

INVENTORS
RALPH E. PAGE
HORACE S. BEATTIE
BY
ATTORNEY

Jan. 13, 1948.  R. E. PAGE ET AL  2,434,512
RECORD CONTROLLED DISTRIBUTING AND ACCOUNTING MACHINE
Filed Dec. 31, 1943  12 Sheets-Sheet 3

INVENTORS
RALPH E. PAGE
HORACE S. BEATTIE
BY
ATTORNEY

Jan. 13, 1948.    R. E. PAGE ET AL    2,434,512
RECORD CONTROLLED DISTRIBUTING AND ACCOUNTING MACHINE
Filed Dec. 31, 1943    12 Sheets-Sheet 4
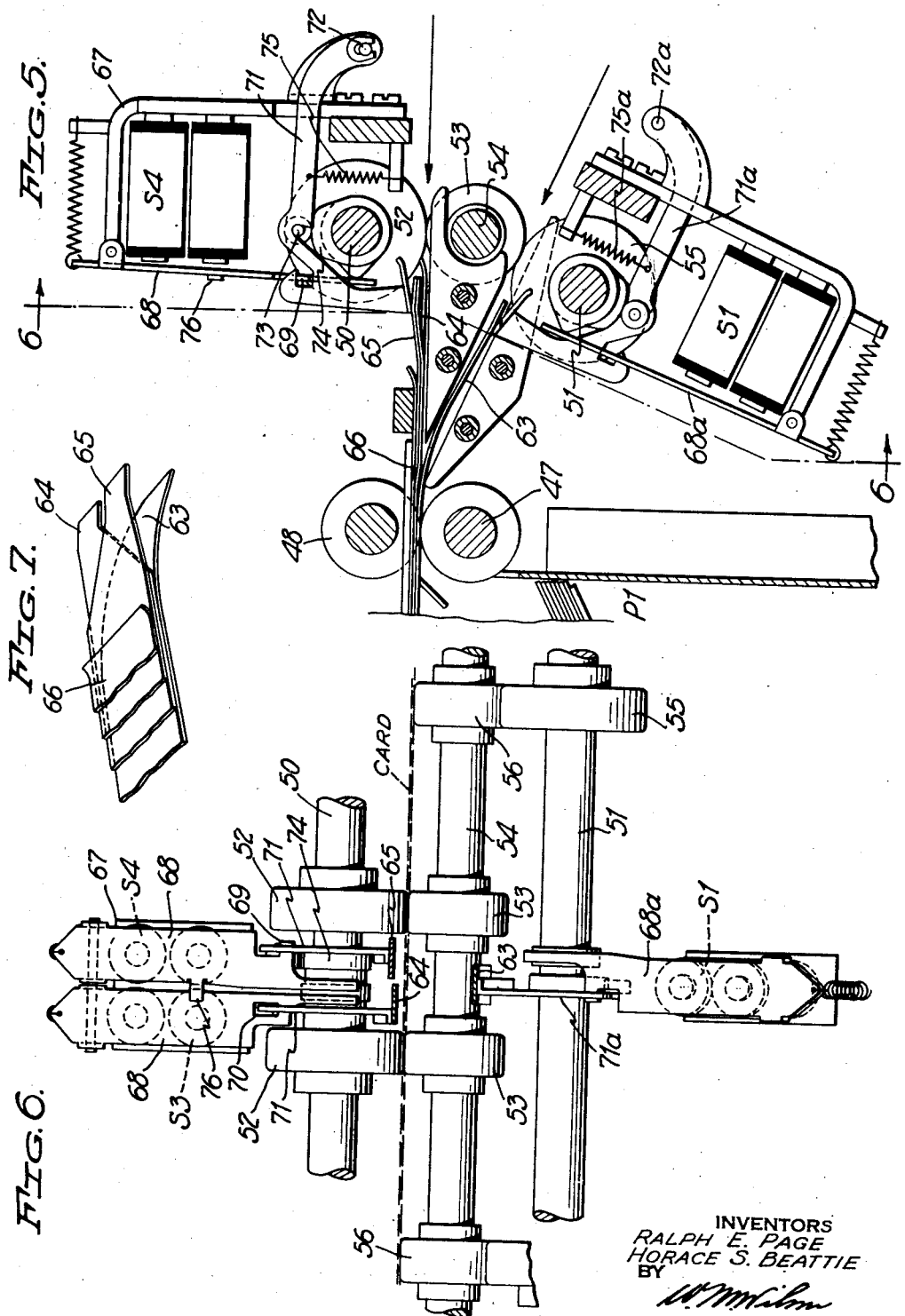
INVENTORS
RALPH E. PAGE
HORACE S. BEATTIE
BY
ATTORNEY Jan. 13, 1948.    R. E. PAGE ET AL    2,434,512
RECORD CONTROLLED DISTRIBUTING AND ACCOUNTING MACHINE
Filed Dec. 31, 1943    12 Sheets-Sheet 5

INVENTORS
RALPH E. PAGE
HORACE S. BEATTIE
BY
ATTORNEY

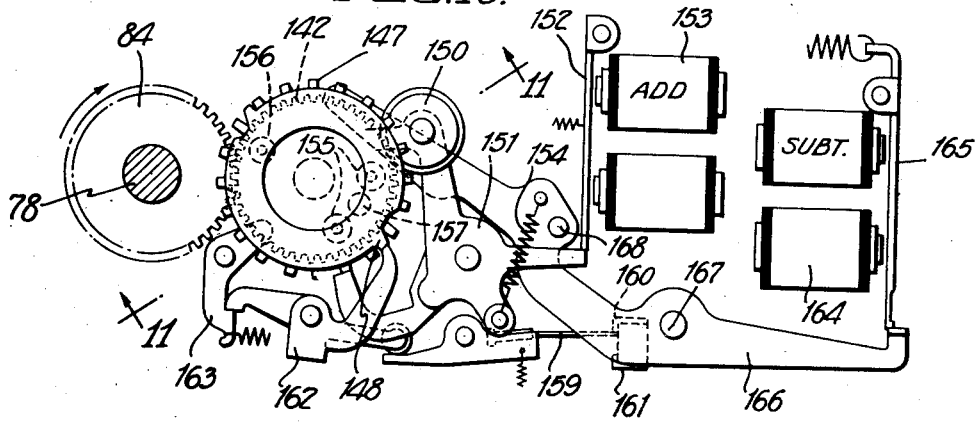
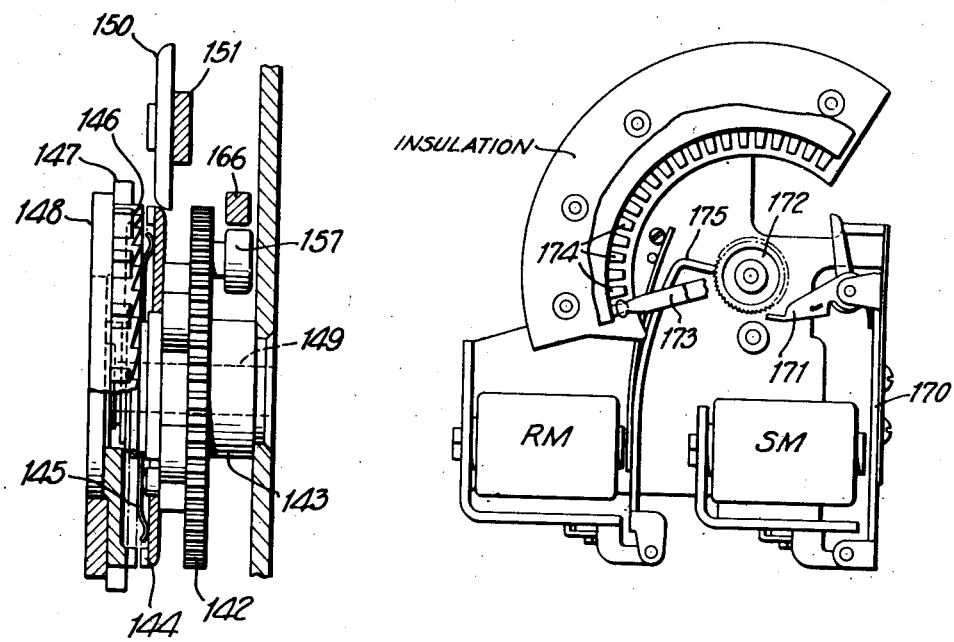

Jan. 13, 1948. R. E. PAGE ET AL 2,434,512
RECORD CONTROLLED DISTRIBUTING AND ACCOUNTING MACHINE
Filed Dec. 31, 1943 12 Sheets-Sheet 7

| CARD | | | | |
|---|---|---|---|---|
| MASTER | 1 | 1 | | |
| MASTER | 2 | 2 | JOHN SMITH | |
| MASTER | 3 | 3 | 300 MAIN STREET | |
|  |  | 4 | NEW YORK N. Y. | |
|  |  | 5 | | |
|  |  | 6 | | |
|  |  | 7 | | |
| MASTER | 4 | 8 | UNPAID BALANCE | 7.50 + |
| MASTER | 5 | 9 | AMOUNT REC'D JUNE 15 | 7.50 − |
| DETAIL | 1 | 10 | 1 PAIR SHOES | 9.00 + |
| DETAIL | 2 | 11 | 1 PAIR PANTS | 9.50 + |
| DETAIL | 3 | 12 | Mdse Returned | 9.00 − |
|  |  | 13 | | |
|  |  | 14 | | |
|  |  | 15 | | 9.50 TOTAL |
|  |  | 16 | | |
|  |  | 17 | | |
| MASTER | 1 | 18 | HENRY STEVENS | |

MASTER FILE   DETAIL FILE

INVENTORS
RALPH E. PAGE
HORACE S. BEATTIE
BY
ATTORNEY

Jan. 13, 1948.  R. E. PAGE ET AL  2,434,512
RECORD CONTROLLED DISTRIBUTING AND ACCOUNTING MACHINE
Filed Dec. 31, 1943  12 Sheets-Sheet 8
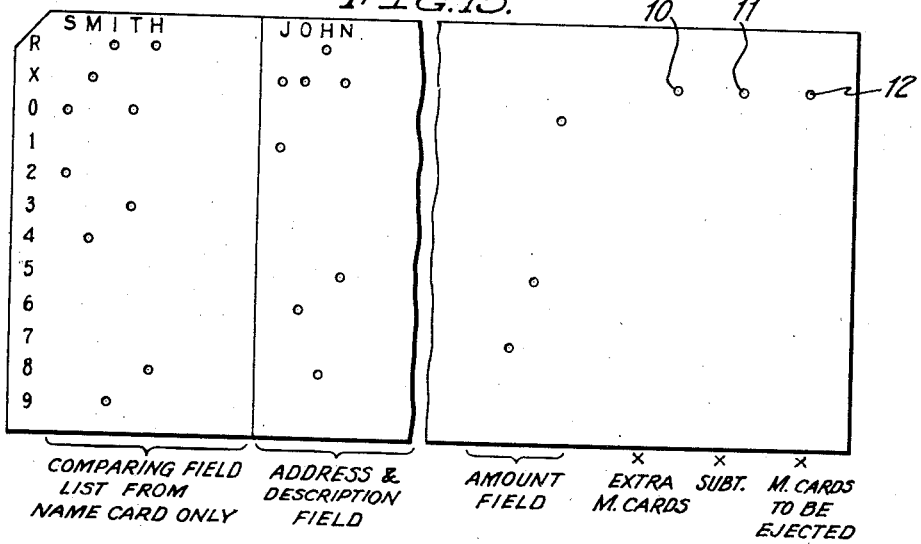
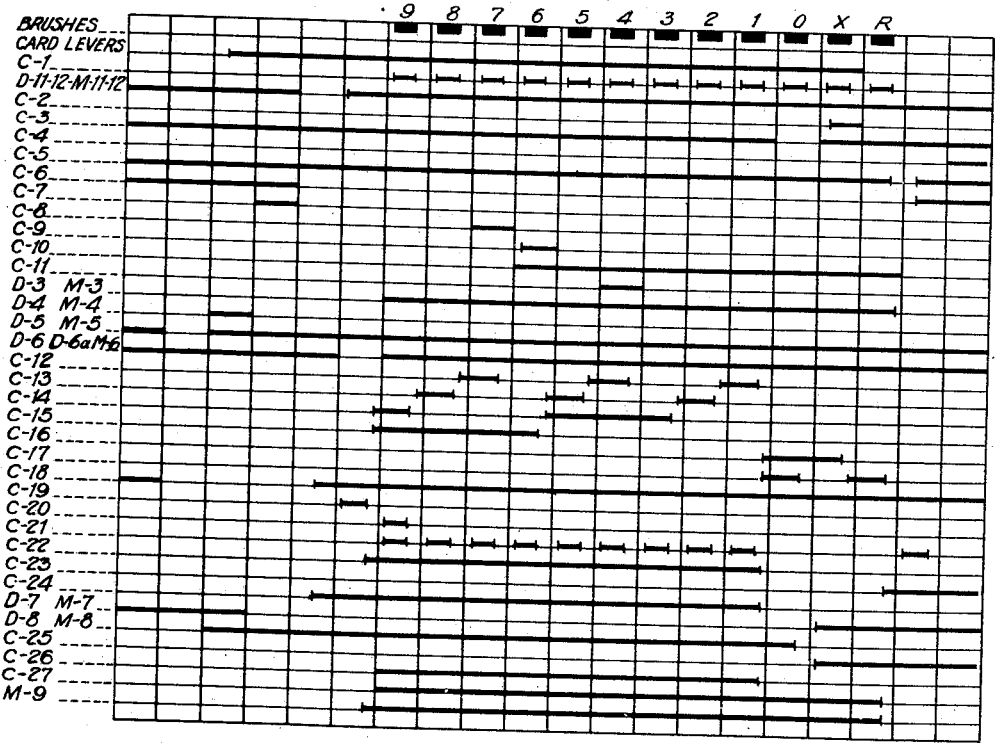
INVENTORS
RALPH E. PAGE
HORACE S. BEATTIE
BY
ATTORNEY

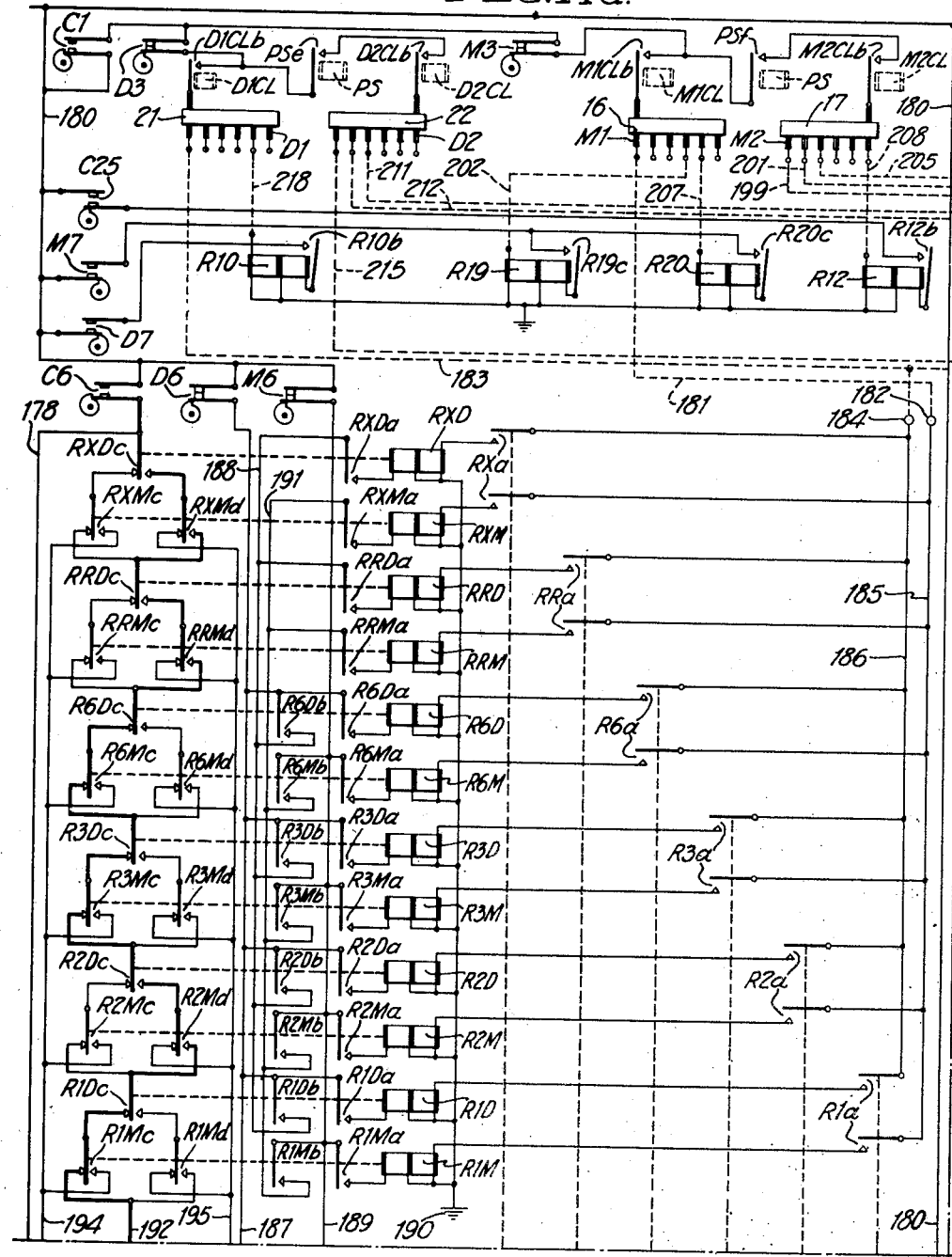

Jan. 13, 1948.  R. E. PAGE ET AL  2,434,512
RECORD CONTROLLED DISTRIBUTING AND ACCOUNTING MACHINE
Filed Dec. 31, 1943  12 Sheets-Sheet 10

INVENTORS
RALPH E. PAGE
HORACE S. BEATTIE
BY
ATTORNEY

Patented Jan. 13, 1948

2,434,512

UNITED STATES PATENT OFFICE 2,434,512

RECORD CONTROLLED DISTRIBUTING AND ACCOUNTING MACHINE

Ralph E. Page, West Orange, and Horace S. Beattie, East Orange, N. J., assignors to International Business Machines Corporation, New York, N. Y., a corporation of New York Application December 31, 1943, Serial No. 516,572

11 Claims. (Cl. 235—61.7)

The present invention relates to accounting machines of the record card controlled type, and its principal object is to provide a machine in which two separate sets of record cards may be concurrently fed through the machine and data designations thereon sensed by separate sensing devices, to control common recording and calculating mechanisms to prepare a complete bill or statement.

In many commercial establishments, it is the practice to maintain a file of so-called master cards comprising cards containing designations relating to names and addresses of different accounts, arranged in alphabetic order and including one or more cards containing additional data. A separate file is also maintained of so-called detail cards, which are arranged in alphabetic order and contain data concerning various transactions. In order to prepare a bill for each account, it is necessary at the present time with existing facilities to combine the two files into a single file arranged in alphabetic order with master cards adjacent to their related detail cards, and it is then necessary to run the cards through an accounting machine in which the bill is prepared. Following this, if it is required that the cards be returned to their original filing order, it is necessary to separate the master cards from the detail cards. All of this requires three separate operations effected in succession and, where the volume of cards involved is great, the consumption of time is considerable in addition to the possibility of cards getting out of order through such frequent handling.

In accordance with the present invention, a machine is provided in which two files of cards are separately placed and separate feeding and sensing mechanism is provided for each, with comparing mechanism operative to cause the feed and sensing of the cards in the same order of succession as though they had been merged into a single file and then sensed in succession. Printing and calculating devices are controlled by the cards as they are sensed, and thereafter the cards may be fed to separate pockets in their original order. Thus, the same results that previously required repeated handling of the cards are effected in a single machine during a single run of the cards therethrough.

Selectively adjustable devices are provided so that, if desired, the two files may be merged into a single file in alphabetic order concurrently with the sensing and recording operations.

According to another feature of the invention, provision is made to separate out into a separate pocket master cards for which there are no related detail cards.

A further object resides in the provision of devices for causing master cards, for which there are no related detail cards, to pass through the machine without operating the recording or calculating devices and for likewise causing detail cards for which there are no related master cards to so pass through the machine. By means of selectively settable devices, such so-called unmatched master and detail cards may be automatically segregated into separate pockets.

A more specific object of the invention resides in the provision of improved alphabetic comparing mechanism for determining conditions of equality and inequality existing between data on two opposed cards.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a central section through the card feeding and sensing mechanism.

Fig. 1a is a detail of a magazine card lever and contact.

Fig. 5 is an enlarged detail of the parts shown in Fig. 1 for controlling the distribution of cards.

Fig. 6 is a view taken generally along lines 6—6 of Fig. 5.

Fig. 7 is a detail showing the configuration of the ends of the card distributing blades.

Fig. 10 is a view showing the essential elements of one order of the accumulating mechanism.

Fig. 11 is a sectional view looking in the direction of lines 11—11 of Fig. 10.

Fig. 12 is a detail of a stepping switch.

Fig. 15 is a fragment of a record card showing the manner in which data is recorded therein.

Fig. 16 is a timing chart of the cam controlled contact devices of the machine.

Figure 4:
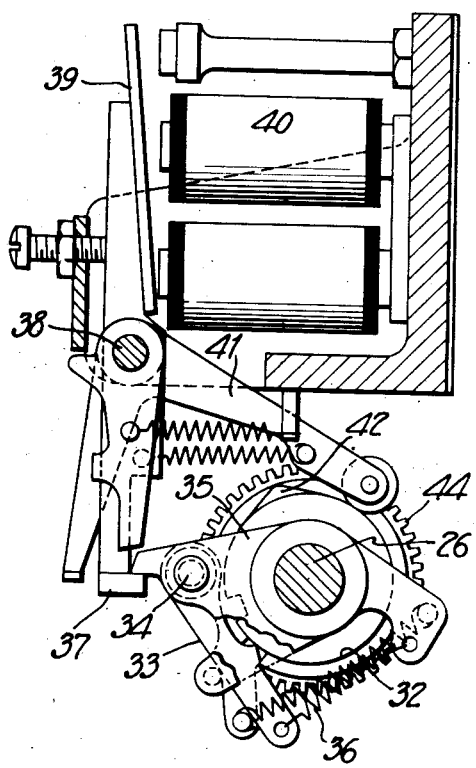
Fig. 4 is an enlarged detail of one of the card feed clutches, the view being a section taken substantially along lines 4—4 of Fig. 2.
Figure 4A:
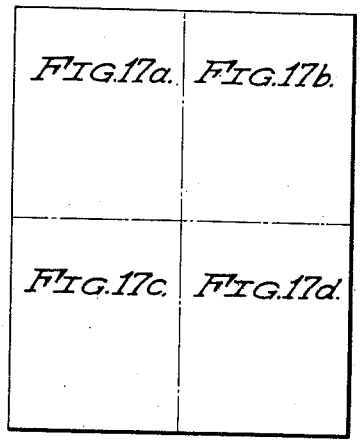
Fig. 4a is a diagram showing the order in which the figures of the circuit diagram are to be arranged.

Figs. 17a, 17b, 17c, and 17d, when arranged in the order indicated in Fig. 4a, constitute a wiring diagram of the electrical circuits of the machine.

THE RECORD CARDS

The record cards which control the machine are the well known Hollerith type (Fig. 15) in which twelve horizontal rows of index point positions are provided. The card is provided with columns in which numerals or alphabetic characters are recorded by single or combinational code perforations by means of which the various characters are represented as follows:

| Character | Positions | Character | Positions |
|---|---|---|---|
| A | R–1 | J | X–1 |
| B | R–2 | K | X–2 |
| C | R–3 | L | X–3 |
| D | R–4 | M | X–4 |
| E | R–5 | N | X–5 |
| F | R–6 | O | X–6 |
| G | R–7 | P | X–7 |
| H | R–8 | Q | X–8 |
| I | R–9 | R | X–9 |
| S | 0–2 | 0 | 0 |
| T | 0–3 | 1 | 1 |
| U | 0–4 | 2 | 2 |
| V | 0–5 | 3 | 3 |
| W | 0–6 | 4 | 4 |
| X | 0–7 | 5 | 5 |
| Y | 0–8 | 6 | 6 |
| Z | 0–9 | 7 | 7 |
|  |  | 8 | 8 |
|  |  | 9 | 9 |

Accordingly, the card in Fig. 15 is perforated to represent the name John Smith at the left end of the card. For filing and machine control purposes, all record cards bearing any data pertinent to the account of John Smith will have the same left hand field perforated with the name Smith or, where the surname is not sufficient identification, all cards may be perforated with the full name. A second field of the card is set aside to receive a street address or city and State. A still further field is set aside to receive designations representing an amount. Cards are also provided with columns set aside to receive special perforations in the X index positions to represent various conditions.

Figures 13, 14:
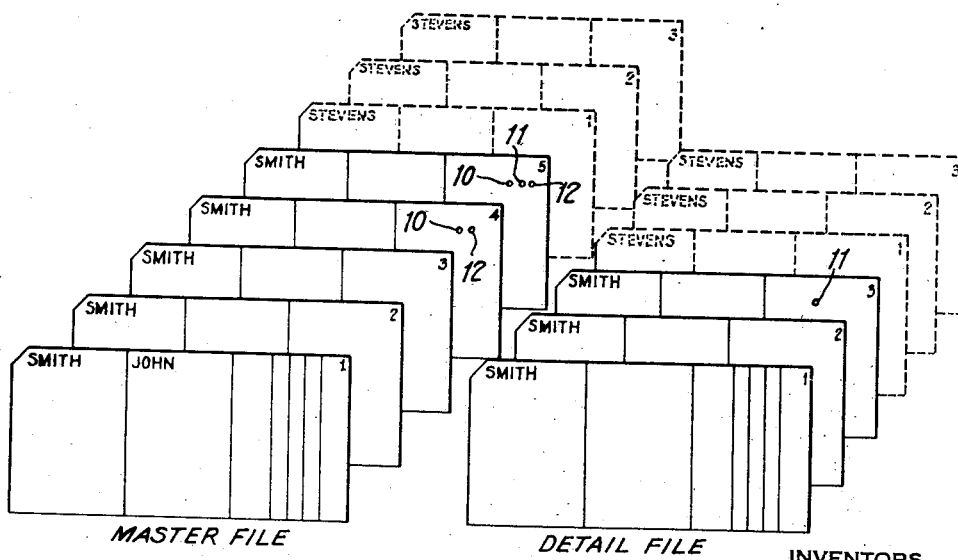
Fig. 13 is a sample of a bill to be prepared by the machine under control of the record cards.
Fig. 14 is a view showing the card arrangement in two separate master and detail files.

Referring to Fig. 14, there are represented two files of cards, the master file and the detail file, each containing a number of cards relating to the account identified as that of John Smith, and each of the cards contains perforations designating such name. In addition, the cards contain information as follows:

Master card #1 The given name John
Master card #2 The street address
Master card #3 The city and State
Master card #4 Explanatory data and an amount
Master card #5 Explanatory data and an amount Of the master cards, the first three are known as address cards, and to distinguish them from other master cards the latter are provided with a special perforation in the X position of a selected column with a perforation designated 10 (Figs. 14 and 15). Where the amount is a debit amount, a further X perforation designated 11 is made in another predetermined column to tell the machine that this amount is to be subtracted. Finally, each of the master cards which it is desired to have removed from the file during an operation of the machine is perforated with a still further X hole, which is designated 12. In the detail file the cards are all perforated with explanatory data and an amount together with the X hole 11 in those cards whose amounts are to be subtracted.

Fig. 13 shows a bill which is to be prepared by the group of cards in Fig. 14 for the account of Smith. Examination of the bill will show that the cards of the master file are to print the address and that, after line spacing has taken place, the remaining master cards print and then the data from the detail cards is printed on the successive lines. While this printing takes place, the amount fields in the several cards control calculating devices which selectively add or subtract the amounts and control printing of the total on the last line of the bill. As will be explained later, the cards, as they pass through the machine, may be redistributed to cause them to be merged into a single file with the master cards preceding the detail cards to form a single group, or they may be caused to divide out into three groups with the three address cards in one, the fourth and fifth master cards in the second group, with the detail cards remaining in a third group. The manner in which these operations are carried out will be fully explained hereinafter. Before explaining the operation of the machine, the separate units thereof will first be briefly explained, after which the operation of the entire organization will be coordinated and the sequence of events explained in connection with the circuit diagram.

CARD FEEDING MECHANISM

Referring to Fig. 1, the master cards are placed in the magazine 13 from which they are fed singly by means of a reciprocating picker 14 to pairs of feed rollers 15 which advance the cards horizontally past the first set of sensing brushes designated M1 and a second set of sensing brushes M2. The brushes M1 and M2 make electrical contact through perforations in the record cards with contact rollers 16 and 17, respectively, which rollers also serve as feed rollers for the cards. The detail cards are placed in the magazine 18 from which they are fed singly by a reciprocating picker 19 to pairs of feed rollers 20 which convey the cards along an inclined plane past sensing brushes designated D1 and D2 which make contact through the perforations in the cards with contact rollers 21 and 22, respectively.

Figure 2:
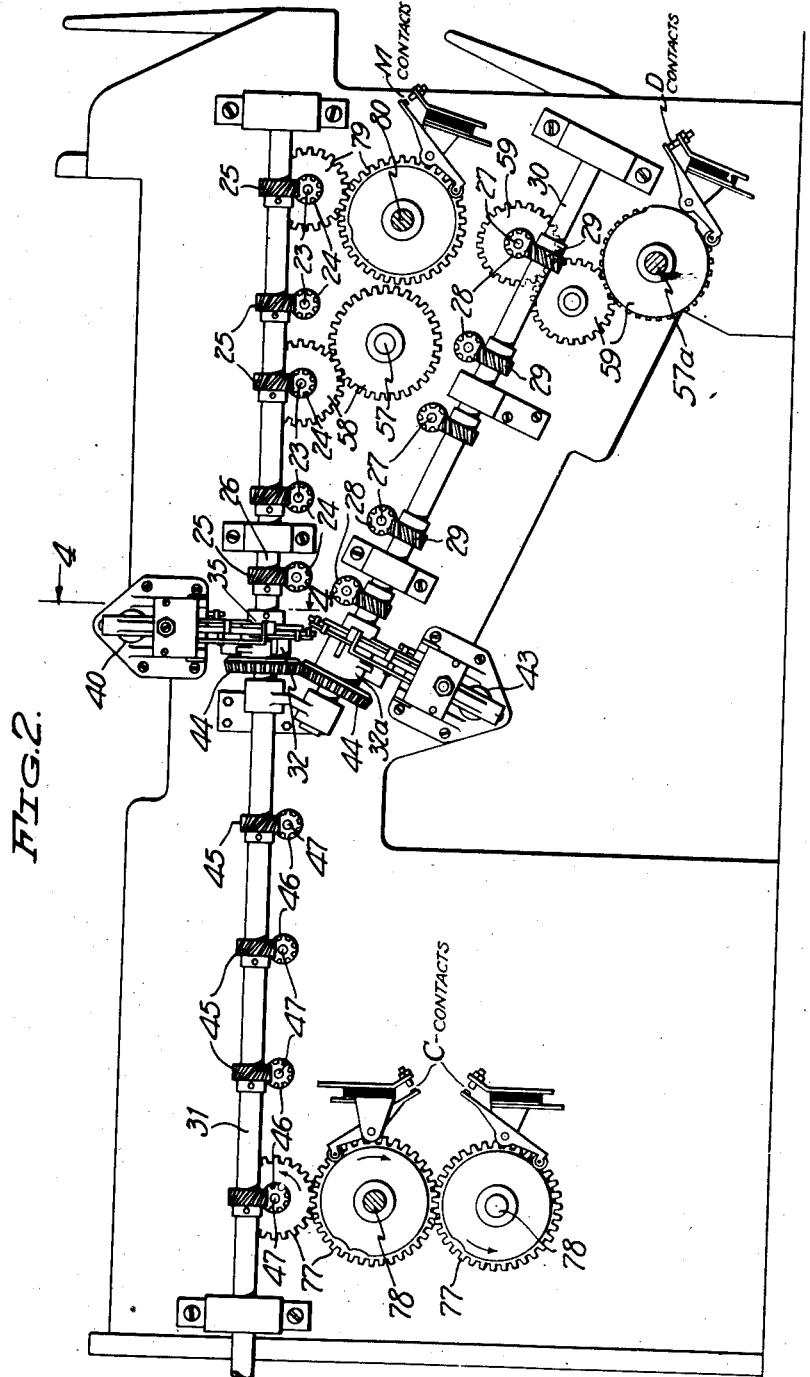
Fig. 2 is a view showing the driving connections for the card feeding mechanism.

The lower of the pairs of rollers 15 and the contact rollers 16 and 17 are secured to shafts generally designated 23 which at their extremities (see Fig. 2) are provided with gears 24 which mesh with gears 25 on a horizontal shaft 26. In the same manner the shafts 27 which support the upper of the pairs of rollers 20 and the contact rollers 21 and 22 have gears 28 at their extremity (see Fig. 2) which mesh with gears 29 secured to an inclined shaft 30. In Fig. 2 is shown a shaft 31 which is in axial alignment with shaft 26 and which is in constant rotation from a suitable source of power, such as an electric motor (not shown). The shaft 31 may be coupled to drive shafts 26 or 30 through suitable clutching mechanism, of which that for the master shaft 26 will now be explained.

Referring to Fig. 4, shaft 31 carries a notched driving element 32 at its extremity which accordingly is in constant rotation. Lying in the plane of the element 32 is a clutching dog 33 which is pivoted at 34 to an arm 35 secured to the master shaft 26. The dog 33 is normally urged by a spring 36 toward the driving element 32 but is restrained by engagement with latch 37 which is pivoted at 38 and is integral with the armature 39 of a clutch magnet 40. Upon energization of magnet 40 armature 39 and latch 37 are rocked clockwise about pivot 38 and release dog 33 for driving engagement with element 32, whereupon shaft 26 will be coupled to shaft 31 and the former will be driven for one revolution, at the end of which dog 33 is engaged by latch 37, and further operation is interrupted unless the magnet 40 is held energized. The clutching mechanism shown in Fig. 4 is provided with the usual clutch knockout lever 41 whose roller is engaged by a cam 42 during the rotation of parts to effect positive restoration of the latch 37 and armature 39.

Generally speaking, the magnet 40 controls a form of one revolution clutch through which shaft 26 is coupled to the constantly rotating shaft 31. The shaft 31 (Fig. 2) through a pair of beveled gears 44 drives a clutch element 32a which corresponds to the clutch element 32, and through a one revolution clutch mechanism exactly the same as that described for the master shaft. The detail shaft 30 may be coupled for driving action upon energization of a magnet designated 43 which corresponds to the magnet 40. The shaft 31 through gears 45 and 46 drives a number of shafts 47 to which (Fig. 1) are secured the lower of pairs of feed rollers 48 which are thus in constant rotation.

Figure 3:
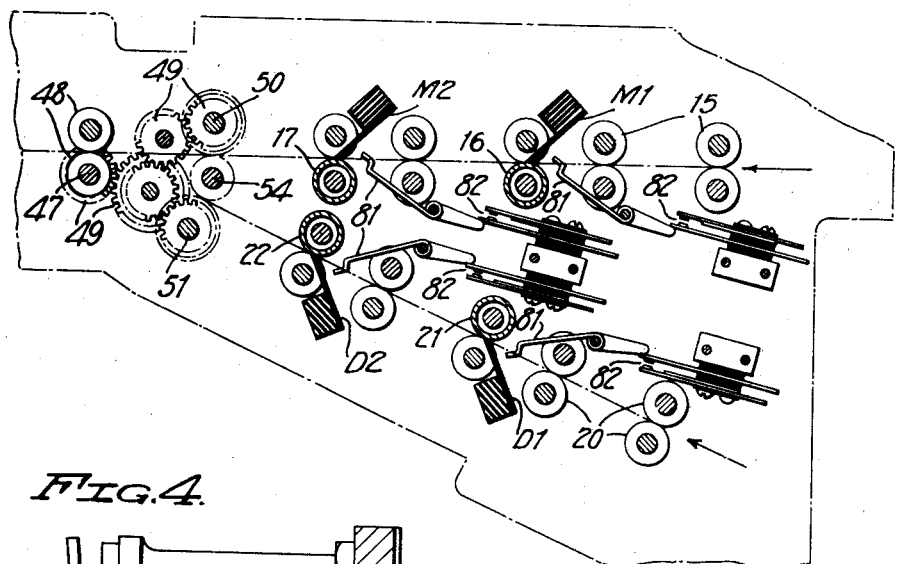
Fig. 3 is a further view of the driving mechanism for the card feeding devices, and the view also shows the location of the several card lever contacts operating devices.

Referring to Fig. 3, the right hand shaft 47 through gearing generally designated 49 drives shafts 50 and 51 in opposite directions. Referring to Figs. 1, 5 and 6, the shaft 50 has secured thereto rollers 52 which cooperate with rollers 53 loose on an intermediate shaft 54, and the shaft 51 has rollers 55 secured thereto which cooperate with rollers 56 also loose on the intermediate shaft 54. Through the gear connections traced, it will be noted that the shafts 50 and 51 and the rollers 53 and 56 are in constant rotation so that, when either the master or detail card is advanced to such rollers, it will be conveyed to the rollers 48 and thence to one of the four pockets designated P1, P2, P3 or P4 in accordance with preselected distribution requirements which will presently be explained.

In Fig. 2, one of the shafts 23 drives a shaft 57 through gears 58 and one of the shafts 27 drives a shaft 57a through gearing designated 59. In Fig. 1 these shafts 57 and 57a carry cams 60 and 60a, respectively, for operating their respective card pickers 14 and 19 through the connections shown.

Referring to Fig. 1a, the magazine 13 is provided with the usual pivoted card lever 61 which serves to hold a pair of contacts 62M closed as long as there are cards in the master magazine 13. A similar pair of contacts is provided for the detail magazine 18 which are indicated on the circuit diagram (Fig. 17d) as 62D.

Referring to Figs. 1 and 5, master and detail cards after they pass the rollers 52, 53, 55 advance toward a set of distributing blades (Fig. 7) which are designated 63, 64, 65 and 66. The blades are so arranged that normally they occupy the position shown in Fig. 5, wherein all the cards are guided into the opening or passageway between the blades 63 and 64, which passageway guides the cards to the second pocket designated P2 in Fig. 1. The blade 63 may have its end elevated so that the detail card passes below the blade, in which event such card will pass to pocket P1. The blade 64 may have its right hand end depressed below the path of travel of the card, in which event a passageway is formed between blades 64 and 65 through which the master card will be guided to the third pocket designated P3. Finally, the right hand end of blade 65 may be depressed below the level of the master card, in which event as will be apparent from Fig. 7 the blade 64 is also depressed, and the card will enter the passageway formed between blades 65 and 66 for conveyance to the last pocket P4.

By thus shifting the positions of the ends of blades 63, 64 and 65 the master cards may be selectively directed to any of the pockets P2, P3 or P4, and the detail cards may be directed to either of the pockets P1 or P2. In other words, with none of the sorting magnets energized, cards will be directed to pocket P2 and cards will be directed to pockets P1, P3 or P4 upon energization of magnets S1, S3 or S4, respectively. The mechanism for shifting the blade ends is controlled by magnets designated S1, S3 and S4 (Figs. 5 and 6) whose manner of operation will now be explained.

Magnets S3 and S4 are suitably mounted in a supporting bracket 67 and each is provided with an armature 68. The armatures are shaped to provide a lug 69 and an opening 70 which are engaged by hook-shaped portions of arms 71 which are pivoted at 72. Thus, each armature 68 holds its related arm 71 normally in raised position, one through engagement with the lug 69 and the other through engagement of its arm with the lower edge of opening 70. The blade operating arm 71 of magnet S3 has a pin 73 carrying a roller cooperating with a cam 74 secured to shaft 50 and a spring 75 normally tends to cause the roller to follow the periphery of the cam. The cam is so proportioned that the arm 71 is raised slightly during each revolution of shaft 50, so as to free the hook-shaped portion of arm 71 from the armature 68 and relieve the magnets S3 and S4 from the frictional load of the parts. The pin 73 cooperates with a notch in arm 71 of magnet S4 to hold said arm up against the tension of its spring 75. Thus, both arms 71 are controlled by a common cam. If magnet S3 is energized, its arm 71 is released to follow the cam which results in counterclockwise rocking of the related arm 71. When magnet S4 is energized, its armature 68 through a lug 76 will also rock armature 68 of magnet S3 so that both arms 71 will rock counterclockwise as viewed in Fig. 5. The arms 71 are roughly L-shaped with the free ends in engagement with blades 64 and 65 so that, when the arms 71 are released by their related magnets, the blade 64 alone or blades 64 and 65 together are shifted to select the passageway to receive the master card.

The magnet S1 controls similar mechanism which is identified by the same reference characters followed by the suffix a. Thus, when magnet S1 is energized, it attracts its armature 68a, whereby the hooked portion of arm 71a is released so that a spring 75a will rock the arm clockwise about its pivot 72a and the free end of the arm will act upon the end of blade 63 to swing it into position to select pocket P1 for reception of the detail card. The shafts 50 and 51 are provided with the usual cam for positively restoring the armatures 68 and 68a after they have been tripped.

Referring to Fig. 2, the shaft 31 through one of the shafts 47 and gearing generally designated 77 drives a pair of shafts 78 upon which are mounted contact closing devices for operating contacts which are generally designated as C contacts, whose number and timing are shown in Fig. 16. These devices are in constant operation as long as the machine functions. Driven from the right hand shaft 23 through gearing 79 is a shaft 80 which rotates only while the master card feeding mechanism is clutched for operation. On this shaft is located a number of cams for operating contacts which are generally designated as M contacts, and in the same manner the shaft 57a of the detail card feeding mechanism carries a number of cams which operate contacts generally designated as the D contacts whose number and timing are also shown in Fig. 16. Thus, the C contacts are in constant operation, the M contacts function only when the master card feeding mechanism is coupled, and the D contacts function only when the detail card feeding mechanism is coupled.

Referring to Fig. 3, the usual card levers are provided and located in the paths of travel of the master and detail cards. These card levers are generally designated 81. Each closes a pair of contacts generally designated 82, which close when a card has been advanced to a predetermined distance short of the related set of sensing brushes M1, M2, D1, D2. These card lever contacts are shown in the circuit diagram (Fig. 17d) in connection with which their function will be later explained.

PRINTING MECHANISM

Figure 8:
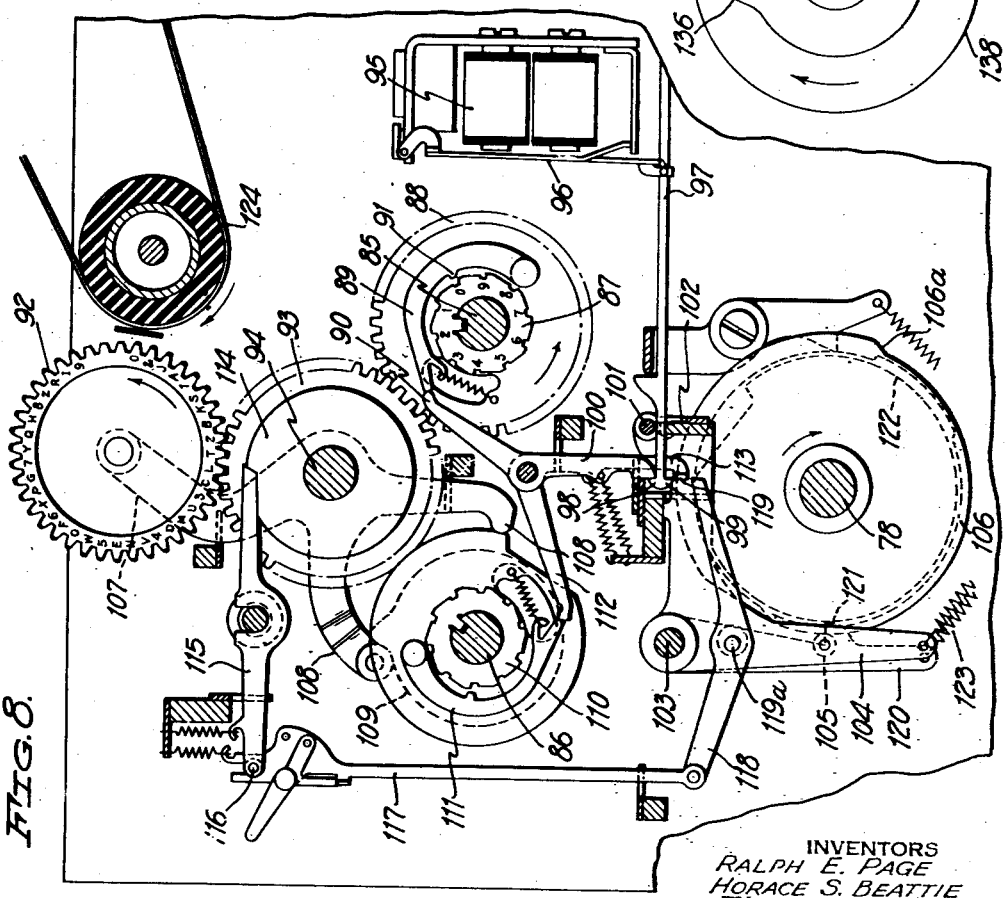
Fig. 8 is a view showing the printing mechanism.

In Fig. 8 shaft 78 is the upper of the two shafts 78 of Fig. 2, and it is, therefore, in constant rotation making one revolution for each cycle of the machine. The printing mechanism driven from this shaft is of a well-known type disclosed in the Fuller et al. Patent 2,199,561, granted May 7, 1940, and this mechanism will, therefore, be but briefly described. Shaft 78 is geared to shafts 85 and 86 as explained in the patent, so that these shafts are driven two revolutions for each revolution of shaft 78.

Shaft 85 fixedly carries a notched clutch disk 87 and adjacent the clutch disk 87 there is loosely mounted gear 88 to which is pivotally mounted a spring-urged clutch pawl 89, the latter being normally engaged by a clutch release arm 90 so as to hold the clutch tooth 91 out of engagement with a clutch notch of the clutch disk 87.

The above described clutch is the printing type selecting clutch and causes the differential rotation of a printing wheel 92. To rotate the type wheel 92, the gear 88 meshes with an idler gear 93 loosely mounted on a shaft 94, and the gear 93 meshes with the type carrying wheel or gear 92 carrying the digit printing type 0–9 inclusive and comprising the numeral type group, the numeral type being spaced four teeth apart. Fig. 8 shows the arrangement of the printing devices for a single order and the machine is preferably provided with duplicate devices for printing the digits of different denominational orders.

The card is perforated with holes to represent the digits 0–9 and passes by the analyzing brushes M2 or D2 (Fig. 1) to analyze the index points in the order 9, 8, 7, . . . 0. When the analyzing brush M2 or D2 senses a hole, a circuit is closed to a printing control magnet 95, and for each card column analyzed there is a printing control magnet. When a printing control magnet 95 is energized, its armature 96 is attracted so as to pull a call wire 97 to the right. The latter has a head portion comprising extensions 98 and 99, the extension 98 normally engaging a lug of an arm 100 which is the integral depending part of the clutch release arm 90. The normal engagement of extension 98 and arm 100 is retained during the time the holes 9, 8, 7, 6, 5, 4, 3, 2, and 1 are analyzed to thereby cause the clutch release arm 90 to be rocked. The clutch pawl 89 is now rocked by its spring to cause its tooth 91 to engage a particular notch of the clutch disk 87 to thereby cause the gear 88 to be rotated and through the idler gear 93 rotate the printing gear wheel 92.

If the "9" or first hole was analyzed, the clutch disk 87 would rotate the extent of one notch before the clutch engagement is effected by the energization of the magnet 95. The printing wheel 92 will thereafter rotate so as to bring the "9" numeral type to the printing line.

In the above manner the printing type wheels are picked up at differential times so that at a predetermined point in the cycle of machine operation the printing wheels will represent at the printing line the selected digits, it being noted that the "0" type is normally at the printing line so that no movement of a printing wheel is necessary to select "0" for printing.

It will be seen that the free end of the call wire 97 passes between a rod 101 and a bar 102 of a bail shaped frame which is pivoted at 103. One side arm of the bail shaped frame has a depending follower arm 104 carrying a roller 105 coacting with a cam 106 secured to the shaft 78. After the "1" index point is analyzed, the "0" hole is sensed by the analyzing brush if it is present, but before analyzing the "0" hole an inclined cam edge 106a of a high portion of cam 106 acting on the follower arm 104 rocks the bail shaped frame clockwise, causing the rod 101 and bar 102 to depress all the free ends of the call wires 97 so as to disengage the extension 98 from the lugs of arms 100 and to engage extensions 99 with lugs 119 of arms 113 so that, when a "0" hole is sensed, magnet 95 will through call wire 97 and lug 99 rock arm 113 for the purpose explained later in connection with alphabet printing. Obviously, with this relationship even though a magnet 95 is energized by the presence of a "0" hole, the printing type selecting clutch for rotating the printing wheel will not be engaged so that, when the printing impression is effected, the "0" digit will be printed.

Each printing wheel is carried by an arm 107 loosely pivoted on the shaft 94 and is provided with follower arms 108, each of which engages a related cam of a pair of complementary cams 109.

There is a printing clutch for each printing wheel for causing the impression to be effected and this is similar to the previously described printing type selecting clutch and comprises the clutch disk 110, a clutch pawl 111 carried by one of the complementary cams 109 and a clutch release arm 112 having an integral depending arm 113.

For each printing wheel that is set to any digit from "1" to "9", a cam 114 attached to a related gear 93 will rock a double arm 115. One end of each arm 115 carries a pin 116 engaging a slot of a link 117, the latter being pivoted to an interposer 118, a series of the interposers 118 being pivoted on a rod 119a. Obviously, when the double arm 115 is rocked by the cam 114, the link 117 is depressed to rock the related interposer 118 to bring its free or right end in front of a lug 119 of the arm 113.

The interposers 118 are carried, as stated, by the rod 119a and the latter is carried by a pair of depending arms 120, one of which is provided with a projection 121 coacting with a profile cam 122 secured to the shaft 78.

After all the index points of the card which comprises the index points 0–9 and the special index points X and R have been analyzed, the projection 121 will drop from the high part of the cam 122 to a low part permitting a spring 123 attached to an arm 120 to shift all the interposers 118 to the right and those that have been rocked by the depression of a related link 117 will by their shifting rock the arms 113 and, therefore, the clutch release arms 112, causing the clutch engagement so that complementary cams 109 will now rotate to rock all the arms 107 to force the printing wheels 92 against the usual inking ribbon and platen 124, around which is fed a paper to be imprinted.

As each arm 107 is rocked, the printing wheel is rotated counterclockwise but, since the printing wheel is rolling over the gear 93, this rolling action will cause an equal and simultaneous rotation in a clockwise direction. Both of these opposite rotations will, in effect, cause the printing wheel 92 to be substantially stationary when it strikes the platen 124, the type striking the latter squarely and firmly to cause a legible impression.

After the printing operation, since the clutch is still engaged, the printing wheels continue to rotate until the clutch pawl 89 strikes the clutch release arm 90, thereby disengaging the clutch which is effected when the printing wheels are at "0". The clutch which causes the rotation of the cams 109 to effect the imprint continues its engagement for a complete rotation of the cams 109 and the clutch disengagement is effected by the engagement of the clutch pawl 111 with the arm 112.

The machine is provided with alphabet character printing type and means for selecting such type so as to print, aside from numerals, letters making up words or abbreviations.

The alphabet type are selected according to groups. The particular group selected determines which of the several type related to an index point will be printed. For example, if the perforation should be the "2" hole, and no pilot hole is utilized in either the "0", "X" or "R" positions, "2" will be printed. If a hole is also at "0", the "0" hole will select the type "S". If at the "X" index point position type "K" will be selected, and if at the "R" index point position type "B" will be selected.

To more clearly understand the principle of operation, it should be noted that from the timing of cam 122 the selected numeral type have their impressions taken therefrom after all the index points have been analyzed and, of course, is after the "R" index point has been analyzed. The alphabet type selection is provided for by taking the printing impression before the time numeral type would have been printed, and this is effected under control of the index points "0", "X", and "R".

If the hole was at the "9" index position alone, the printing wheel 92 would rotate counterclockwise until "9" was at the printing line and then the printing wheel carrying arm 107 would be rocked to effect the imprint. It will be noted that, if a perforation was at the "R" position and, then, under control of this perforation, the printing impression clutch 110, 111 was engaged, the printing wheel 92 will be rocked earlier than for printing a numeral "9" to take an imprint from the "I" type. The perforation at the "X" position will take an imprint some time earlier to print "R" and the perforation at the "0" position still earlier to print "Z". The same principle of operation is provided for selecting the other alphabet type.

Obviously, the energization of a magnet 95 will, after the "1" perforation is analyzed, cause the arm 113 to be rocked and the clutch release arm 112 to be rocked, and at a time depending upon the pilot hole analyzed. Hence, the type printing clutch 110, 111 will be released to cause the printing impression from the selected type.

It is pointed out that for alphabet type printing, impressions are made at three different points in the operation cycle or after the "0", "X" and "R" perforations are analyzed, whereas for numeral printing the impressions are made only after all the perforations are analyzed and at a single point in the operating cycle.

PAPER LINE SPACING

Figure 9:
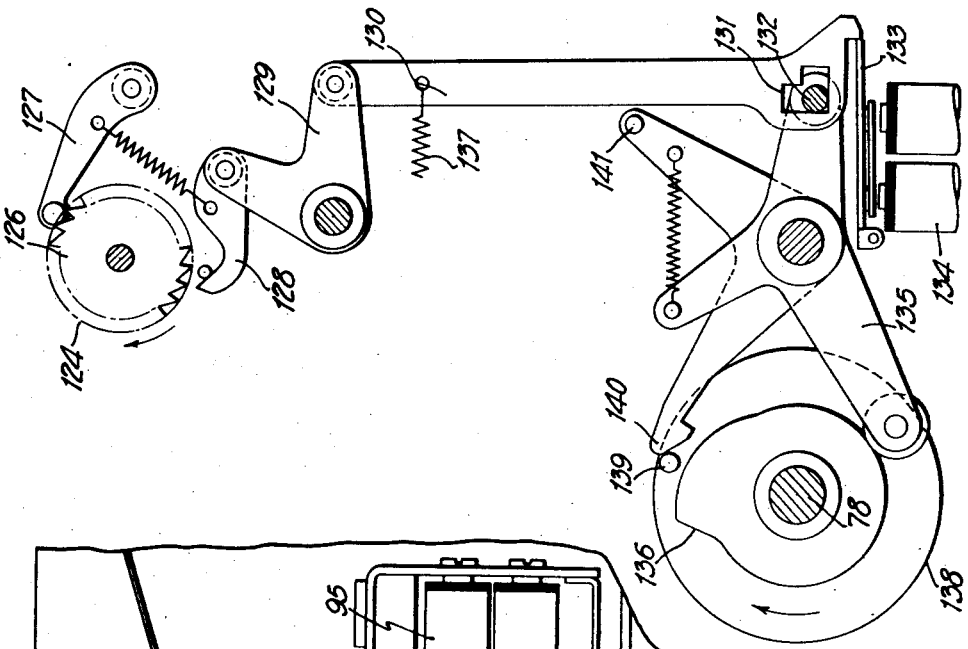
Fig. 9 is a view showing the paper spacing mechanism.

Referring to Fig. 9, the platen 124 has the usual spacing ratchet 126 secured thereto, with which there is associated the usual detenting arm 127 and pawl 128. Pawl 128 is pivoted upon bell crank 129 connected to a depending link 130, the lower end of which is provided with an L-shaped slot through which a pin 132 extends. The armature 133 of a magnet 134 normally holds the lower end of link 130 toward the right as shown. Pin 132 is carried by one arm on the three-arm lever 135 which is oscillated by a cam 136 on shaft 78, so that for each revolution of the shaft pin 132 moves up and then down again. With the link 130 latched in the position shown, the pin moves idly in the vertical part of slot 131 without disturbing the position of the link. When magnet 134 is energized, the link 130 is released and a spring 137 shifts the same to bring the right end of the notch 131 into line with pin 132, so that, when the pin is now moved up, it will elevate the link 130 to effect paper line spacing. The shaft 78 also carries a disk 138 in which is secured pin 139 that engages a bell crank lever 140 whose pin 141 will rock link 130 back to its latched position after the paper spacing operation.

ACCUMULATING MECHANISM

The machine is provided with adding mechanism, of which one denominational order is shown in Fig. 10. This mechanism is also driven from the constantly running shaft 78 through a gear 84 mounted on the shaft. This accumulating mechanism is of a well known type shown in Patent 2,165,288, granted July 11, 1939, to which reference may be had for a more detailed disclosure. A brief description of the operation thereof will accordingly be sufficient herein.

The gear 84 on shaft 78 drives gear 142 (Fig. 11) freely about a post 143, and driven by gear 142 is a ratchet 144 which is axially movable but normally held in the position shown in Fig. 11 by a leaf spring 145. Coaxial with driving ratchet 144 is a ratchet 146 which is part of the accumulating or adding element comprising adding wheel 147 and tens carry cam 148, which are integral with a rod 149. Ratchet 144 may be rocked into engagement with ratchet 146 to drive the latter and such rocking is effected by a bevel disk 150 carried by a bell crank 151, which is normally latched in the position shown in Fig. 10 by the armature 152 of adding magnet 153. When magnet 153 is energized, bell crank 151 is released and spring 154 will rock it to move disk 150 toward the axis of ratchet 144, thereby camming the ratchet 144 into driving engagement with the driven ratchet 146. The gear 142 carries rollers 155 the first of which engages an extension of lever 151 to effect uncoupling when the first roller reaches the extension of the lever. If a unit is to be carried from a lower order, magnet 153 is reenergized to effect a new driving engagement and, after one step of movement, the second roller 155 will engage lever 151 to effect uncoupling after such carry entry operation.

As usual, magnet 153 is energized at differential times, i. e. one, two, three, etc. up to nine so-called cycle points before the first roller 155 effects uncoupling, so that the digital value entered into wheel 147 is dependent upon such time of energization of magnet 153. Thus, if a 7 is to be entered, magnet 153 is energized seven points before the knockout position and wheel 147 will have been advanced seven steps. The carry cam 148 controls the usual tens carry contacts comprising movable contact blade 159 and stationary blades 160 and 161, which functions so that whenever the wheel 147 passes from 9 to 0 member 162 is rocked clockwise and held by latch 163 as shown in Fig. 10 to hold blade 159 in engagement with blade 160.

Whenever the wheel 147 stands at 9, a depression in the wheel will permit the member 162 to rock counterclockwise, thereby enabling blade 159 to rock clockwise and engage the blade 161. The roller 156 is provided for releasing carry lever latch 163 at the end of the cycle. The carry contact blades 159, 160 are utilized for canceling or clearing the adding wheel. This is effected as follows: Magnet 153 is energized at a time to cause the wheel 147 to be driven ten steps, during which the wheel will pass from 9 to 0 with the resulting engagement of blades 159 and 160. As will be explained in connection with the circuit diagram, such contact engagement will cause energization of the so-called subtracting magnet 164. This magnet attracts its armature 165 to release lever 166 for counterclockwise rotation about its pivot 167 under the influence of spring 154. Pin 168 in the lever will thereupon engage and rock bell crank 151 clockwise to uncouple the ratchets and leave the wheel 147 in its 0 or home position. The usual roller 157 is provided which engages and restores the lever 166 to its normal position.

When an amount is to be subtracted, the adding magnet 153 is energized at a time appropriate for adding the digit 9 and thereafter the subtracting magnet 164 is energized at a time corresponding to the value of the amount of the digit to be subtracted, the net result being that the wheel 147 is advanced an amount corresponding to the 9's complement of the digit to be subtracted. Thus, for example, if the digit 7 is to be subtracted, the adding magnet is energized at the 9 time and wheel 147 commences to rotate as though to advance nine steps. After it has advanced two steps, however, the subtracting magnet is energized and uncoupling is effected, thus leaving the wheel 147 advanced two steps in accordance with the 9's complement of 7.

STEPPING SWITCH

In Fig. 12 is shown a well known form of stepping switch which is utilized in programming the operations of the machine, and a brief explanation of this device will be given. The stepping magnet designated SM, when energized, will rock its armature 170 to which pawl 171 is pivoted so that the pawl will engage and advance ratchet 172. Secured to the ratchet is a switch arm 173 which for each step of advance of the ratchet will contact a different one of a series of contact segments 174. The ratchet 172 is normally biased to rotate counterclockwise by the usual spring, not shown, and is restrained from doing so by the latching armature 175 of release magnet RM, which magnet when energized will rock its armature out of engagement with the ratchet, so that the same will swing back to its initial or starting position shown in Fig. 12. For the purpose of the invention, the ratchet 172 has two arms 173 and two sets of contacts 174 associated therewith which are shown diagrammatically in Fig. 17d, where the second set is identified as 173a and 174a. The circuits controlled by these stepping relays will be explained in connection with the circuit diagram.

CIRCUIT DIAGRAM

The circuit diagram (Figs. 17a to 17d) will now be explained with particular reference to the problem outlined in connection with Figs. 13 and 14, that is, in explaining the diagram it will be assumed that two files of cards, as in Fig. 14, are placed in the machine and during its operation the two files of cards will jointly control the various mechanisms to prepare the bill or invoice of Fig. 13. The description will be subdivided into cycles of operation, and the sequence of operations will be explained in the order in which they occur. In the circuit diagram a system of identification for the relay magnets is followed wherein the contacts are given the same reference character as the controlling magnet followed by a lower case letter. In most cases the contacts are shown adjacent to their controlling magnets. In a number of instances, however, where it would unduly complicate the circuit connections, the contacts are shown remote from their controlling magnets. In such instances, the system of identification will serve to identify the elements and in addition, where a magnet and its contacts are separated, the magnet is shown in dotted outline adjacent the related contacts. The various cam controlled contacts identified as C, D and M contacts have their timing shown in Fig. 16 which is to be considered in connection with the circuit diagram.

PRELIMINARY OPERATION

Several plug connections indicated by dotted lines in the circuit diagram are first made to associate the fields of the cards with desired positions of the adding and printing devices. The group of master cards of Fig. 14 is placed in magazine 13 (Fig. 1) and the group of detail cards is placed in magazine 18. The bill of Fig. 13 is placed around the platen 124 (Fig. 8) with its line 1 in printing position. With these preliminary operations effected, current is supplied to main line designated 180 in the circuit diagram, Figs.

17a and 17b, and as a result the main driving motor (not shown) is placed in constant operation to continuously drive the main shaft 31 (Fig. 2) and the C contact cams.

If the start key is now depressed to close contacts 176 (Fig. 17d), a circuit is traceable from line 180, stop key contacts 177, contacts C2, 176, start relay ST and thence to ground 190. Relay ST closes its contacts STa to provide a holding circuit traceable from line 180, contacts 177, magazine card lever contacts 62M and 62D, contacts STa, relay ST to ground 190. The relay ST will accordingly remain energized until the stop key is operated or cards run out of either magazine. The usual contacts C3 short circuit contacts 177, 62M and 62D, so that, if any of these contacts open, their circuit will nevertheless be held until contacts C3 open at a definite time in the cycle (see Fig. 16).

Shortly after relay ST is energized, contacts C6 close and complete a circuit from line 180 (Fig. 17a), contacts C6, wire 178 (Fig. 17c), right hand contacts M1CLc and D1CLd in parallel, relays LD and HD in parallel to ground 190. This circuit is completed each cycle prior to the operation of the start key but is of no effect until the present cycle. Now with contacts STd closed (Fig. 17d), a circuit is completed near the end of the cycle when contacts C4 (Fig. 17d) close which is traceable from line 180 (Fig. 17d), contacts C4, STb, wire 179, and in parallel through contacts HDc and LDc, right hand contacts PSi and PSj, master and detail clutch magnets 40 and 43 to ground 190.

Cycle 1

With both card feed clutch magnets energized, the M and D cam contacts function, and during the cycle now ensuing the first M and D cards are advanced from magazines 13 and 19, respectively, and their leading edges fed to a point between brush M1 and the second set of rollers 16 for card M and to a point between brush D1 and the second set of rollers 20 for card D, which advance is not sufficient to operate the card levers, so that at the end of this cycle the card lever contacts 82 are still open. Contacts C6 will again cause energization of relays LD and HD so that, when contacts C4 close at the end of the cycle, the clutch magnets 40 and 43 are again energized to initiate a second card feeding cycle.

Cycle 2

Figure 17B:
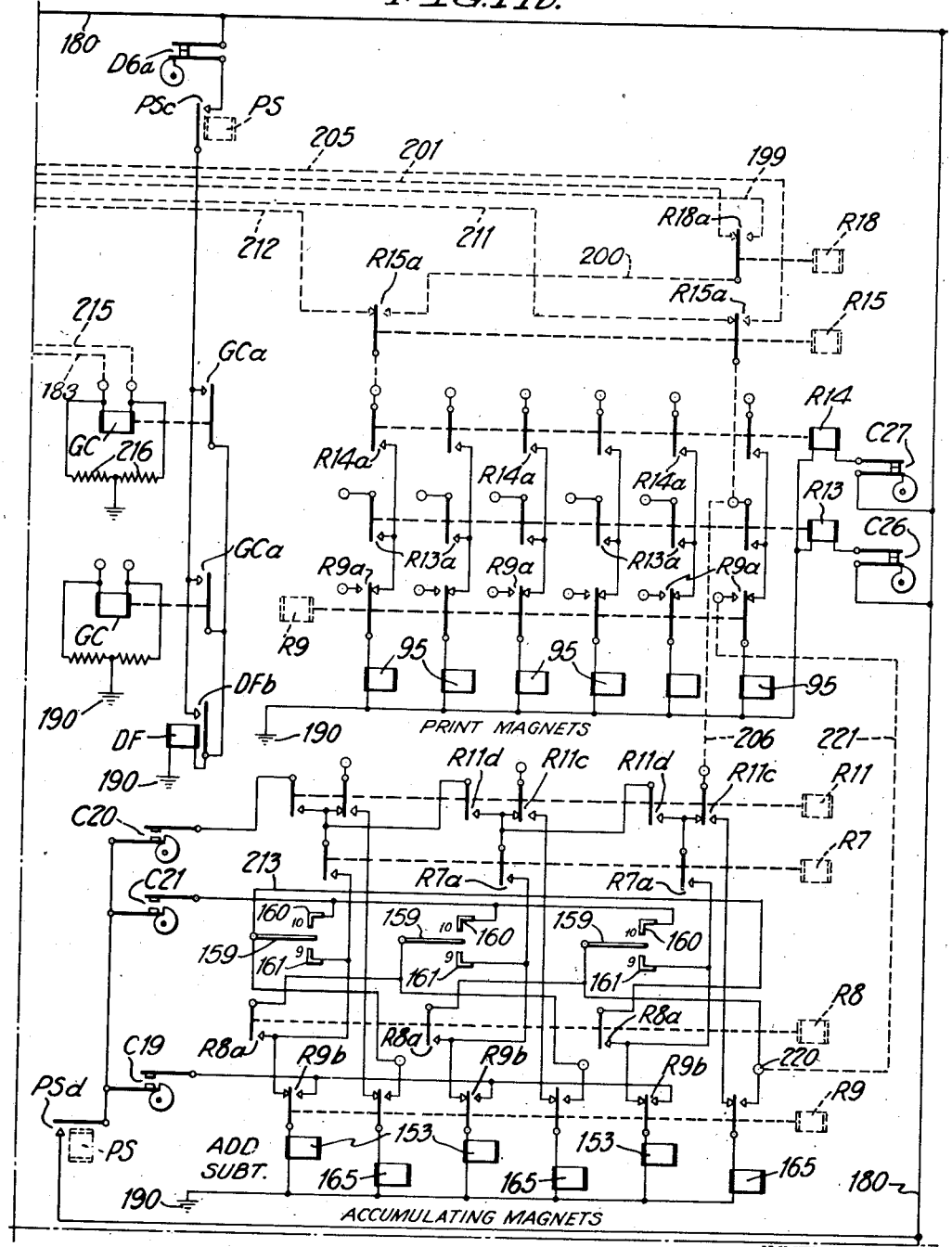
Figure 17C:
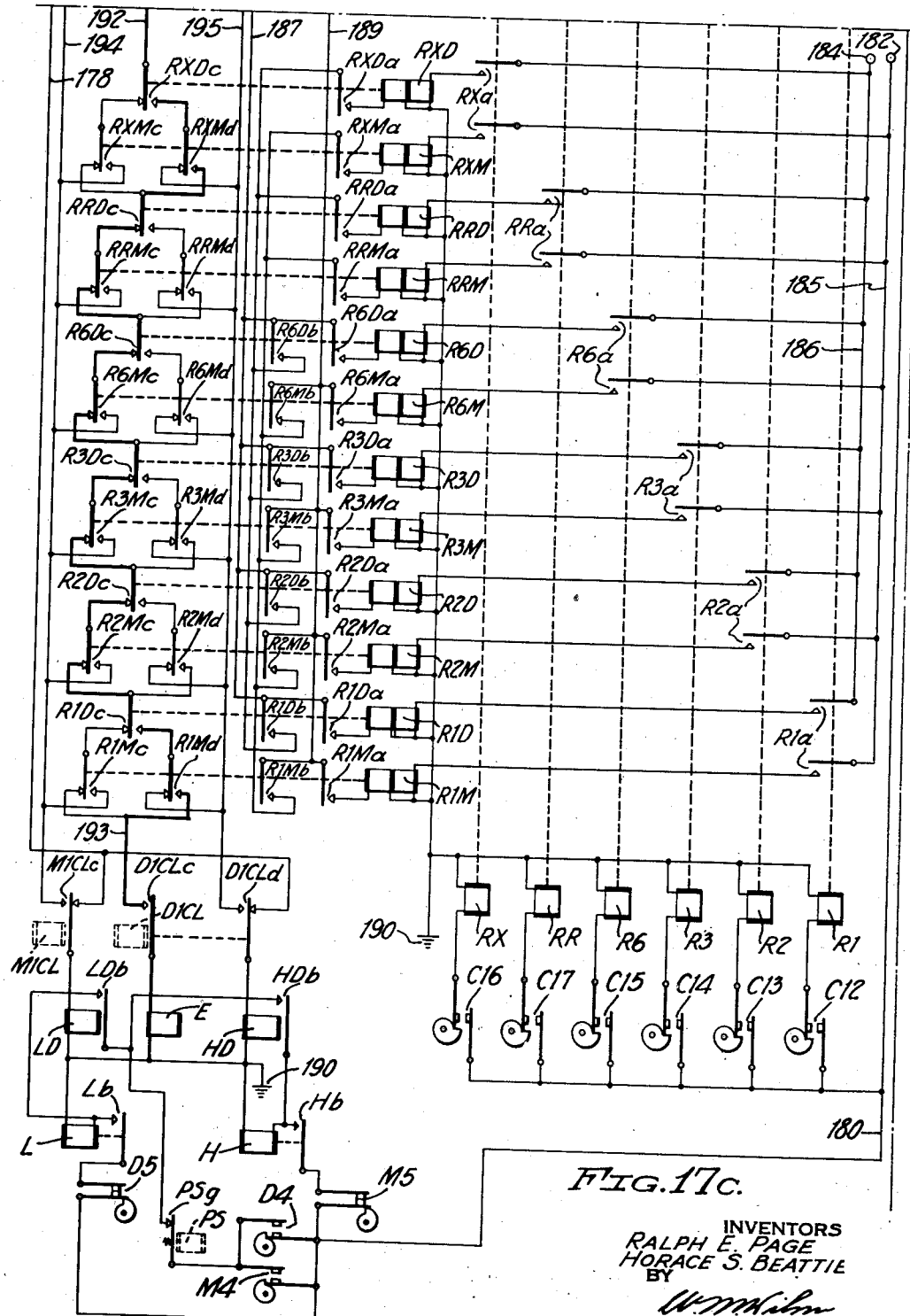
Figure 17D:
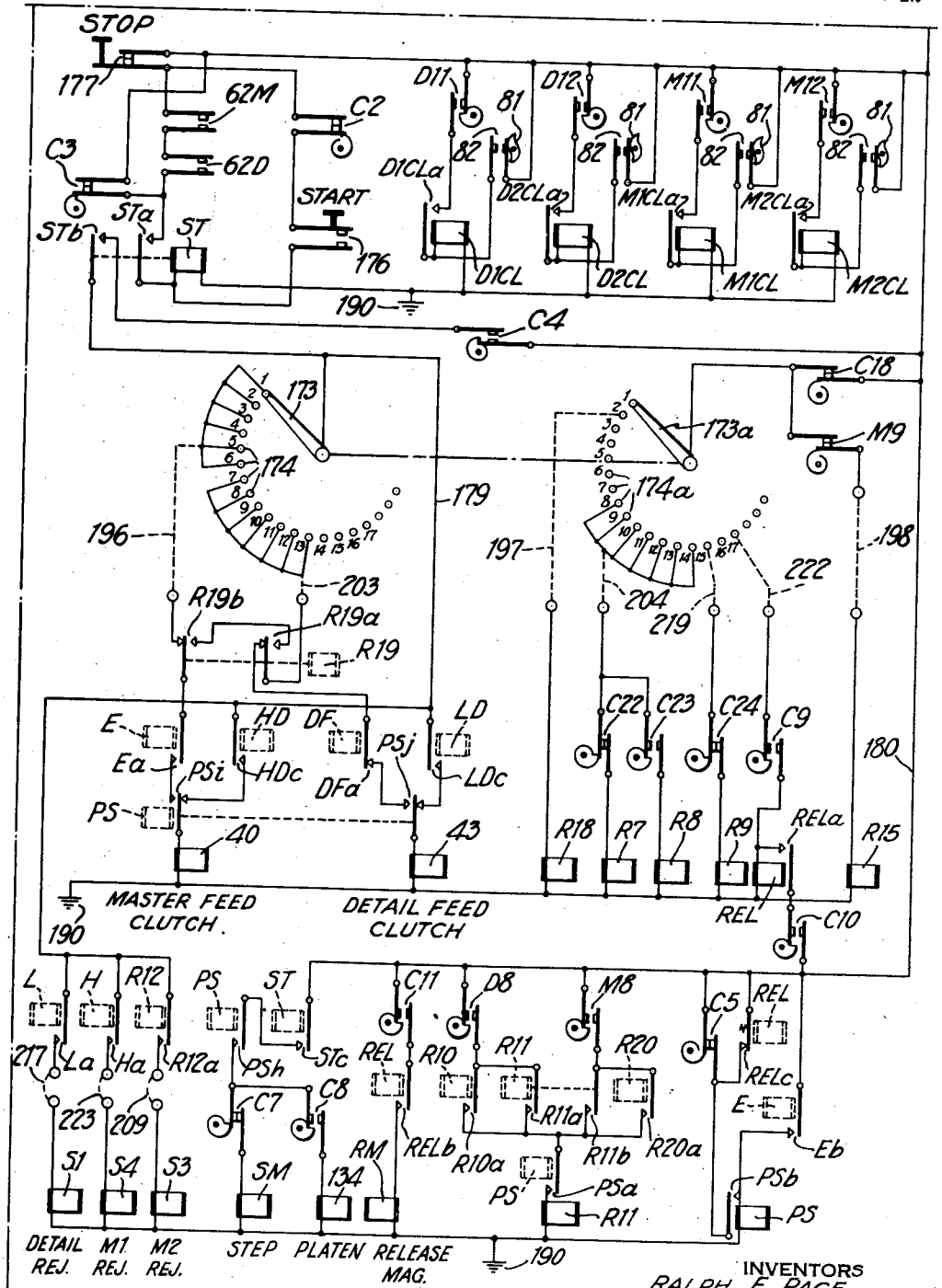

During this cycle, the first M and D cards continue their advance toward brushes M1 and D1, and before reaching the brushes they close their respective card lever contacts 82 whereupon circuits are completed in Fig. 17d from line 180, the second and fourth contacts 82 from the right, relays D1CL and M1CL to ground 190. These relays close contacts D1CLa and M1CLa, respectively, to provide holding circuits through contacts D11 and M11 which, as seen from Fig. 16, overlap the period of closure of the card lever contacts so that from this point on the relays will remain energized as long as cards continue to follow.

*Card comparing through brushes M1 and D1.*— As the two cards pass brushes M1 and D1, the index point positions are sensed at the times indicated in Fig. 16 along the line designated "brushes" at the points 9, 8, 7, etc. and for brush M1 a circuit is partially established which is traceable in Fig. 17a from line 180, contacts C1, M3, M1CLb (now closed), contact roller 16, brush M1, plug connection 181 to a socket 182. A parallel circuit is also traceable from line 180, contacts C1, D3, D1CLb, roller 21, brush D1, plug connection 183, to socket 184. Only a single connection 181 and 183 is shown as representative, but it is to be understood that there is a separate such connection to additional sockets 182, 184 (Fig. 17c) from each brush D1 and M1 traversing the name columns of the cards.

Before completing the tracing of the circuits, reference is made to Fig. 17c wherein contacts C12 to C17 are shown and to Fig. 16 from which it is seen that contacts C12 close as the 7, 4 and 1 positions on the cards are sensed, contacts C13 close as the 8, 5 and 2 positions on the cards are sensed, contacts C14 close as the 9, 5, 4 and 3 positions on the cards are sensed, contacts C15 close as the 9, 8, 7 and 6 positions on the cards are sensed, contacts C16 close as the 0 and X positions on the cards are sensed, and contacts C17 close as the 0 and R positions on the cards are sensed.

Accordingly, relays R1, R2, R3, R6, RX and RR are energized at times when their connected contacts C12 to C17 close as is apparent from Fig. 17c. These relays close contacts shown in vertical alignment therewith in Figs. 17a and 17c and designated R1a, R2a, etc.

Assuming the columns sensed to contain the letter S represented by perforations in the 2 and 0 positions (see Fig. 15), then when the 2 hole of the master card is at brush M1 the circuit already partially traced continues from socket 182 (Fig. 17a), through wire 185, contacts R2a (now closed), one winding of a double wound relay R2M to ground 190. At the same time, the circuit from socket 184 continues through wire 186, another pair of contacts R2a, relay R2D to ground 190. Later in the cycle when the 0 hole is sensed parallel circuits are traceable from sockets 182 and 184, wires 185 and 186, contacts RXa, RRa, relays RXM, RXD, RRM and RRD to ground 190.

For a second comparison column of the example chosen, the column of the card containing the letter M (Fig. 15) would have its sensing brushes connected to sockets 182, 184 of Fig. 17c and since for this letter perforations are made in the 4 and X positions, relays R1M, R1D, R3M and R3D will be energized upon sensing of the 4 hole and relays RXM and RXD will be energized upon sensing of the X hole. These relays are the ones shown in Fig. 17c, of course. Whenever one of the relays suffixed M (as relay R1M) is energized it closes contacts suffixed a (as contacts R1Ma) which provide a holding circuit through the second winding of the relay traceable for example, from line 180 (Fig. 17a) contacts M6, wire 189, contacts R1Ma, relay R1M to ground 190. Similarly the relays suffixed D (as relay R1D) when energized close contacts suffixed a (as contact R1Da) to provide a holding circuit from line 180, contacts D6, wire 187, contacts R1Da, relay R1D to ground 190.

In the case of relays RXD and RRD the holding circuit is from contacts D6, wire 187, one of the contacts suffixed b of relays R1D to R6D, wire 188, contacts RXDa or RRDa to these relays and to ground 190. Likewise in the case of relays RXM and RRM the holding circuit is from contacts M6, wire 189, one of the contacts suffixed b of relays R1M to R6M, wire 191 to relay RXM or RRM to ground 190. In accordance with this relay system, as explained, the digits 9 to 1 cause energization of combinations of the relays prefixed R1, R2, R3 or R6 and the designations 0, X and R cause energization of one or both of the relays, prefixed RX and RR. The following table will give the relays energized for each letter of the alphabet and for each separate digit for the master card.

| Character | Relays | Character | Relays |
|---|---|---|---|
| A | RRM, R1M | J | RXM, R1M. |
| B | RRM, R2M | K | RXM, R2M. |
| C | RRM, R3M | L | RXM, R3M. |
| D | RRM, R1M, R3M | M | RXM, R1M, R3M. |
| E | RRM, R2M, R3M | N | RXM, R2M, R3M. |
| F | RRM, R6M | O | RXM, R6M. |
| G | RRM, R1M, R6M | P | RXM, R1M, R6M. |
| H | RRM, R2M, R6M | Q | RXM, R2M, R6M. |
| I | RRM, R3M, R6M | R | RXM, R3M, R6M. |
| S | RRM, RXM, R2M | 0 | RRM, RXM. |
| T | RRM, RXM, R3M | 1 | R1M. |
| U | RRM, RXM, R1M, R3M | 2 | R2M. |
| V | RRM, RXM, R2M, R3M | 3 | R3M. |
| W | RRM, RXM, R6M | 4 | R1M, R3M. |
| X | RRM, RXM, R1M, R6M | 5 | R2M, R3M. |
| Y | RRM, RXM, R2M, R6M | 6 | R6M. |
| Z | RRM, RXM, R3M, R6M | 7 | R1M, R6M. |
|  |  | 8 | R2M, R6M. |
|  |  | 9 | R3M, R6M. |

These relays, when energized, remain so until the following cycle when contacts M6 or D6 open and they also shift contacts shown at the left in Figs. 17a and 17c which contacts are suffixed c and d. These contacts are interconnected to form what may be termed a comparing chain through which a determination is made as to whether the columns sensed are alike and if unlike which card contains the higher valued designation in the alphabetic or numeric sequence.

For the example chosen the relays are energized in accordance with the name Smith in both the master and detail cards so that the following relays in Fig. 17a will be in energized condition after all positions of the two cards in the columns containing the letter S have been sensed.

RRM, RXM and R2M for the master card and RRD, RXD and R2D for the detail card.

The letter M in the next column will have caused energization of the following relays of Fig. 17c.

RXM, R3M and R1M for the master card and RXD, R3D and R1D for the detail card.

Only two sets of the relays are shown and it will be understood that further sets are provided to take care of additional comparing columns.

When contacts C6 (Fig. 17a) close near the end of the cycle, a circuit, as emphasized by heavy lines, will accordingly be traceable as follows: From line 188 (Fig. 17a), contacts C6, contacts RXDc (right), RXMd (right), RRDc (right), RRMd (right), R6Dc (left), R6Mc (left), R3Dc (left), R3Mc (left), R2Dc (right), R2Md (right), R1Dc (left), R1Mc (left), wire 192 (Fig. 17c) contacts RXDc (right), RXMd (right), RRDc (left), RRMc (left), R6Dc (left), R6Mc (left), R3Dc (left), R3Mc (left), R2Dc (left), R2Mc (left), R1Dc (right), R1Md (right), wire 193, contacts D1CLc (now closed) relay E to ground 190.

Whenever the columns compared have the same designations therefor, relay E is energized. To show what occurs for conditions of dissimilarity, let it be assumed that the same two columns of the master card contained the letters ST and the detail card contained the letters SM. As a result, the relays of Fig. 17a would be energized in the same combinations as before for the letter S. The relays in Fig. 17c would be energized as follows:

RRM, RXM, R3M for letter T in the master card.

RXD, R3D and R1D for letter M in the detail card.

The resulting circuit established upon closure of contacts C6 would be the same as already traced in Fig. 17a and continue through wire 192, Fig. 17c, contacts RXDc (right), RXMd (right), RRDc (left), RRMc (right), wire 194, contacts M1CLc (now shifted), relay LD to ground 190. This relay LD is thus energized whenever the detail card is the lower in value or alphabetic sequence, of the two cards compared.

To illustrate the third condition wherein the detail card is greater than the master card, let it be assumed that the master card contains the letters SM and the detail card contains the letters ST. As a result, the relays of Fig. 17a would be energized in the same combinations as before for the letter S and the circuit would run from contacts C6 to the equals wire 192. The relays in Fig. 17c would be energized as follows:

RRD, RXD, R3D for letter T in the detail card.
RXM, R3M, R1M for letter M in the master card.

The resulting circuit established would then continue from wire 192 (Fig. 17c) contacts RXDc (right), RXMd (right), RRDc (right), RRMD (left), wire 195, contacts D1CLd (now shifted), relay HD to ground 190. This relay HD is thus energized whenever the detail card is the higher in value or alphabetic sequence of the two cards compared.

For the problem of Fig. 14, therefore, the equal relay E becomes energized upon closure of the testing contacts C6. Relay E closes it contacts Eb (Fig. 17d) to energize the program start relay PS which in turn closes its contacts PSb to provide a holding circuit through contacts C5 which (see Fig. 16) will maintain the relay energized throughout the following cycle. A parallel holding circuit extends from line 180, contacts RELc, PSb and relay PS to ground. This circuit is maintained until relay REL is energized as explained later under the heading "Cycle 18."

Relay E also closes a pair of contacts Ea (Fig. 17d) through which a circuit is now traceable from line 180, contacts C4, STb, switch arm 173, the 1 segment 174, plug connection 196, contacts R19b, Ea, PSi, master feed clutch magnet 40 to ground 190. As a result, the master card continues to feed for another cycle and the detail card feed stops as there is no circuit now available to energize clutch magnet 43. The detail card setting is held in the comparing relays, while master cards are being fed because of the fact that contacts D6 (Fig. 17a) are in closed position when the detail feed stops.

Cycle 3

During this cycle, the master card alone advances toward brushes M2 (Fig 1), first closing the related card lever contacts 82 (farthest to the right in Fig. 17d) to energize relay M2CL which sets up a holding circuit through contacts M2CLa and M12. When contacts M6 (Fig. 17a) open, the relays energized in response to the sensing of the first master card are de-energized but those energized in response to the sensing of the first detail card remain held since contacts D6 remain closed when the detail card feed stopped. Consequently, as the second master card now passes brushes M1 and, since it also contains the name Smith, the same master relays are set up as in the last cycle and contacts M6 hold the setting as before.

Prior to sensing of the first master card by brushes M2, contacts C7 (Figs. 17d and 16) close to complete a circuit from line 180, contacts STc, PSh, C7, relay SM to ground 190. Magnet SM functions to advance the stepping switch arms 173, 173a to contact their 2 segments so that later, when contacts C18 close, a circuit is traceable from line 180, switch arm 173a, the 2 segment 174a, connection 197, relay R18 to ground. Shortly thereafter, a second circuit is completed from line 180, contacts C18, M9, connection 198, relay R15 to ground 190.

Relays R18 and R15 shift their respective contacts R18a and R15a (Fig. 17b) so that as the first master card now passes brushes M2, circuit connections will be completed to the printing mechanism to list the name John Smith on the bill of Fig. 13. It may be explained at this point, that as the card traverses the brushes M2 and at the time contacts C8 (Figs. 17d and 16) close, a circuit is completed from line 180, contacts STc, PSh, C8, platen magnet 134 to ground 190. This results in spacing the bill from line 1 to line 2 through the mechanism of Fig. 9 as explained.

The print controlling connection of but one column of the card has been shown, as illustrative, and this is traceable as follows: From line 180 (Fig. 17a) contacts C1, M3, PSf, M2CLb, common roller 17, brush M2 traversing the name field of the card (the brush M2 farthest to the left), plug connection 199 (Fig. 17b), contacts R18a (right), connection 200, contacts R15a (right), contacts R14a (closed as will be presently explained), contact R9a, print magnet 95 to ground 190. Contacts R14a are closed when relay R14 is energized through a circuit from line 180, contacts C27 (see Fig. 16) relay R14 to ground 190.

The print magnets 95, in response to the sensing of perforations in the card will position the type wheels to print on line 2 of the bill, the name John Smith.

This printing from the first master card takes place while the comparing relays are set up under control of the second master card passing brushes M1 and near the end of the cycle when contacts C6 again close the relay E (Fig. 17c) is again energized and it in turn again causes energization of relay PS so that the circuit to the master feed clutch magnet 40 is again completed being traceable this time from line 180 (Fig. 17d), contact C4, STb, arm 173, the 2 segment 174, connection 196, contacts R19b, Ea, PSi, and magnet 40 to ground 190. As a result, the master cards continue to feed for another cycle during which the third card passes brushes M1 while the second card passes brushes M2 and the first card passes to the pocket P2. The detail card feed remains idle.

Cycle 4

When contacts C7 close, magnet SM (Fig. 17d) is energized to step arms 173, 173a to their 3 segments. It will be noted that when C18 closes in this cycle there is no connection available to energize relay R18 so its contacts R18a remain in the position of Fig. 17b. Relay R15, however, is energized as before and as the second master card, containing the street address, passes brushes M2, printing circuits are completed of which the following is representative. From line 180 (Fig. 17a), contacts C1, M3, PSf, M2CLb, roller 17, brush M2, traversing the street address field, connection 201 (Fig. 17b) contacts R18a (left), R15a (right), R14a, R9a, to print magnet 95, to print the street address from a different field of the master card under control of the same type wheels that printed the name from the preceding card.

During this cycle also the master comparing relays of Figs. 17a and 17c are de-energized and readjusted as before since the card passing brushes M1 during this cycle also contains the name Smith. When testing contacts C6 close, the relay E is again energized to bring about feeding of the fourth master card past the brushes M1.

Cycle 5

During this cycle the stepping switch arms 173 and 173a advance to contact their 4 segments. The third master card passes brushes M2 which sense the city and state field of the card and control printing in the same manner as explained for Cycle 4. The fourth master card will again set up the master comparing relays for the name Smith and, as before, the relay E will become energized near the end of the cycle to initiate a still further master card feeding cycle.

This fourth master card (see Figs. 14 and 15) contains the special hole 10 which signals that this is an amount card and it also contains the special hole 12 indicating that this card is to be ejected into pocket P3. The 10 hole is sensed by a brush M1 and the circuit therethrough is traceable from line 180 (Fig. 17a), contacts C1, M3, M1CLb, roller 16, brush M1, plug connection 202, relay R19 to ground 190. The relay closes its contacts R19c to establish a holding circuit through contacts M7 which keep the relay energized until the next cycle.

Relay R19 shifts its contacts R19b (Fig. 17d) so that when contacts C4 close near the end of the cycle, the master feed clutch magnet 40 is not re-energized as in the previous cycle. As a result the master feed comes to rest at the end of this cycle with the comparing relays set to represent the name Smith and contacts C6 as before energize relay E which in turn energizes relay PS (Fig. 17d). Relay R19 is held energized through contacts M7 (Fig. 17a) which remain closed when the master feed comes to a stop and the relay R19 thus remains energized through the following Cycles 6, 7 and 8 until in Cycle 9 the master feed resumes operation.

Cycle 6

When contacts C7 close in this cycle (during which both card feeds are idle) switch arms 173, 173a advance to their 5 segments and when contacts C8 close the platen is spaced to present line 5 of the bill (Fig. 13) to the printing line.

Cycle 7

This cycle is a repetition of Cycle 6 and during the same, arms 173, 173a advance to segments 6 and the platen is spaced to present line 6 of the bill.

Cycle 8

This cycle is also a repetition of the Cycle 6 and during the same, arms 173, 173a advance to segments 7 and the platen is spaced to present line 7 of the bill. When contacts C4 close near the end of this cycle a circuit is completed from line 180 (Fig. 17d) contacts C4, ST$b$, arm 173, 7 segment 174, connection 203, contacts R19$a$ (right), R19$b$ (right), E$a$, PS$i$, master feed clutch magnet 40 to ground 190. Thus, there is provided an interruption of card feeding to enable spacing of the bill from the upper address receiving portion to the body in which the items of account will now be recorded.

Resumption of master card feeding will then take place in the next following cycle.

Cycle 9

With the M cams again in operation, contacts M7 open to de-energize relay R19 and the fifth master card passes brushes M1 as the fourth master card passes brushes M2. The fifth card again sets up the comparing relays for the name Smith after the previous setting had been disabled by opening of the holding contacts M6, so that near the end of the cycle the relay E is once again energized.

When contacts C7 close early in the cycle the stepping magnet SM is energized to advance arms 173, 173a to their 8 segments and shortly thereafter when contacts C18 close a circuit is completed from line 180 (Fig. 17d), contacts C18, arm 173a, 8 segment 174a, connection 204, contacts C22, and relay R7 to ground 190. About the same time, contacts M9 also energize relay R15. Accordingly as the fourth master card now passes brushes M2 the designation "Unpaid Balance" is sensed to control the printing wheels, and concurrently the amount "7.50" in the amount field is sensed and circuits completed of which the following is representative. From line 180 (Fig. 17a) contacts C1, M3, PS$j$, M2CL$b$, roller 17, brush M2, connection 205 (Fig. 17b) contacts R15$a$ (right), connection 206, contacts R11$c$ (left), R7$a$ (right), R9$b$ (left), adding magnet 153 to ground 190.

This circuit is, of course, completed at the differential time depending upon the digital value sensed and the adding wheel will be advanced accordingly to enter the value sensed, into the accumulator. During such entry period contacts C8 (Fig. 17d) close to energize relay 134 so that the platen advances the bill to line 8 and printing will take place as indicated in Fig. 13.

Referring to Figs. 17b and 16, cam contacts C26 are closed during the card sensing period so that the relay R13 will be energized and its contacts R13$a$ closed at such time. As a result, the adding circuit will branch from contacts R15$a$, through contacts R13$a$, R9$a$ (right) to print magnet 95 and ground 190 to thereby effect printing of the amount added. No tens carry operations are evolved during this cycle since this is the first entry into the accumulator. Such tens carry circuits will be traced in the next cycle.

The fifth master card also contains the special holes 10 and 12 of which the hole 10 causes re-energization of relay R19 as for the fourth card. In addition, this fifth card contains the special subtract hole 11 which is sensed by a brush M1 to energize relay R20 (Fig 17a) through a plug connection 207. The relay R20 closes its contacts R20$b$ which provide a holding circuit through contacts M7 so that this relay is held coextensively with relay R19.

At the same time that holes 10 and 12 in the fifth card are sensed by brushes M1, the 12 hole in the fourth card is sensed by a brush M2 and a circuit is completed therethrough and through a connection 208 (Fig. 17a) to energize relay R12 which closes its contacts R12$b$ to provide a holding circuit through contacts C25.

Relay R12 closes a pair of contacts R12$a$ (Fig. 17d) through which a circuit is completed near the end of the cycle traceable from line 180, contacts C4, ST$b$, wire 179, contacts R12$a$, plug connection 209, magnet S3 to ground 190. Magnet S3 will cause the distributing blade 64 of Fig. 7 to be depressed so that the fourth master card will proceed to pocket P3 whereas the preceding three cards fed to pocket P2.

Cycle 10

At the beginning of this cycle, relays R19 and R20 are energized. As the fifth master card passes brushes M2, the designation "Amount Rec'd June 15" will be printed together with the amount "7.50" on line 9 of the bill. The entry of this amount will be effected subtractively, however, in the following manner:

Relay R20 closes it contacts R20$a$ (Fig. 17d) so that when contacts M8 close a circuit is completed from line 180, contacts M8, R20$a$, PS$a$, relay R11 to ground, relay R11 closing its contacts R11$b$ to provide a holding circuit through contacts M8. Relay R11 shifts its contacts R11$c$ and R11$d$ in Fig. 17b so that at the "9" entry time in the cycle when contacts C20 close, parallel circuits are traceable through all the adding magnets traceable from line 180, contacts PS$d$, C20, contacts R11$d$, R7$a$, R9$b$ (left), to magnets 153. Contacts R7$a$ in this circuit are closed at this time due to energization of relay R7 (Fig. 17d) through a circuit traceable from line 180, contacts C18, arm 173$a$, 10 spot 174$a$, connection 204, contacts C22, relay R7 to ground. For those card columns containing amount perforations, the subsequent entry circuits are traceable from connection 205, contacts R15 (right) connection 206, contacts R11$c$ (right), R9$b$ (left), subtract magnet 165 to ground 190. Thus the adding wheels are advanced an amount proportional to the 9's complement of the amount sensed and for the example chosen, the amount standing in the accumulator at the end of the cycle will contain nines in all denominational orders.

Just as for the fourth card, the hole 12 is sensed by a brush M2 to energize relay R12 which in turn causes magnet S3 to be energized and deflect this card into pocket P3.

While the foregoing listing and subtracting operations are taking place, the first master card related to the name Stevens is passing brushes M1 and the comparing relays now receive a new setting which is different from the setting for the detail card which has been retained throughout the several preceding cycles. From the prior explanation of the comparing relay chain it will be apparent that when the testing contacts C6 now close near the end of the cycle, relay LD (Fig. 17c) will be energized denoting a condition of low detail card.

When contacts C4 close near the end of the cycle a circuit is completed from line 180, contacts C4 (Fig. 17d), STb, arm 113, 9 segment 174, connection 283, contacts R18a (left), contacts DFa, PSj (left), detail feed clutch magnet 43 to ground 190 and as a result the detail card now feeds while the master card remains idle.

Cycle 11

During this cycle contacts C7 complete the circuit to energize magnet SM which will advance the stepping arms 173, 173a to contact their 10 segments and relay R7 is again energized but relay R15 is not, since contacts M9 now remain open. As the first detail card now passes brushes D2, after having closed the related card lever contacts to energize relay D2CL (Fig. 17d) entering circuits are completed to print the data on line 10 of the bill and add the amount 9.00 into the accumulator. A representative entry circuit may be traced as follows: From line 180 (Fig. 17a), contacts C1, D3, PSe, D2CLb, roller 22, brush D2, plug connection 211, (Fig. 17b), contacts R15a (left), R13a, R9a (right), to print magnet 95. The circuit branches through connection 206 to contacts R11c (left), R7a, R9b (left) to adding magnet 153 and to ground 190. In the columns containing the descriptive data the circuit extends only to the printing magnets and is traceable, for example, from line 180 (Fig. 17a), contact C1, D3, PSe, D2CLb, roller 22, brush D2, plug connection 212 (Fig. 17b), contacts R15a, (left), R14a, R9a (right) and print magnet 95 to ground 190.

Since the amount standing in the accumulator prior to this cycle was 999.99 (for a 5 place accumulator) the addition of 9.00 will result in tens carries from the third through the fourth and fifth orders and from the fifth into the first to enter the so-called elusive or fugitive one. This is effected as follows: In the third order the addition of 9 caused the carry brush 159 (Figs. 17b and 10) to contact arm 160 so that when contacts C21 close for the last time near the end of the cycle (see Fig. 16) a circuit is traceable from line 180, contacts PSd, C21, arm 160 in the third order (consider this the right hand order of Fig. 17b), brush 159, contacts R8a, R9b (left) to magnet 153 of the fourth order. This circuit branches at contacts R8a through arm 161 and brush 159 of the fourth order, contacts R8a and R9b to magnet 153 of the fifth order and this in turn branches through arm 161 and brush 159 of the fifth order through a wire 213 to contacts R8a and R9b of the lowest order. These circuits are timed to enter a unit in the several orders in the usual manner. Contacts R8a are closed by relay R8 (Fig. 17d) which is energized through a circuit from line 180, contacts C18, arm 173a, the 10 segment 174a, connection 204, contacts C23, relay R8 to ground 190. Thus at the end of the cycle the amount standing in the accumulator is 9.00.

During this cycle the first detail card passing the brushes D2 is compared with the second detail card concurrently passing brushes D1. This comparison is simply to determine whether both cards relate to the same account, namely, Smith, and employs a known type of balanced circuit comprising for each column compared a relay designated GC in Fig. 17b, of which two are shown. The relay is connected through plug connections 183 and 215 to brushes D1 and D2 related to the same card column so that if both columns contain the same perforation or perforations the circuits will both be shunted around the magnet through resistors 216. If either circuit is completed without the other, the magnet will become energized and close its contacts GCa. Tracing these circuits, that for the brush D1 is traceable from line 180 (Fig. 17a), contacts C1, D3, D1CLb, roller 21, brush D1, connection 183 (Fig. 17b) resistance 216 to ground, and for the brush D2, from line 180, contacts C1, D3, PSe, D2CLb, roller 22, brush D2, connection 215, resistance 216 to ground.

Since both the cards concurrently sensed in this cycle are alike the magnets GC are not energized at this time. When contacts C6 close near the end of the cycle, the relay LD is again energized as before explained in connection with Cycle 10 so that when contacts C4 close later, the detail card feed clutch magnet 43 is again energized as already explained.

Cycle 12

During this cycle the second detail card passes brushes D2 as the third detail card passes brushes D1 and prior to this the arms 173, 173a are stepped to contact their 11 segments. The operations involved in the cycle are the same as for Cycle 11, namely, the data is printed on line 11 of the bill and the amount 9.50 is additively entered into the accumulator from the second card.

The third detail card contains the special hole 11 designating that its amount is to be subtracted and this hole is sensed by a brush D1 to energize relay R10 (Fig. 17a) through a circuit from line 180, contacts C1, D3, D1CLb, roller 21, brush D1, connection 218, relay R10 to ground. Relay R10 closes its contacts R10b, to provide a holding circuit through contacts D7 and also closes contacts R10a (Fig. 17d) through which a circuit is traceable from line 180, contacts D8 (which close before contacts D7 open in the next cycle) R10a, PSa, relay R11 to ground 190. Relay R11, as explained, conditions the circuits of Fig. 17b so that the amount entry during the following cycle will be subtractive.

Cycle 13

During this cycle the third detail card passes brushes D2 and line 12 of the bill is printed and the amount 9.00 is subtractively entered into the accumulator so that the total therein is now 9.50.

The arms 173, 173a are stepped to contact their 12 segments.

The first detail card of the group designated Stevens now passes brushes D1 and the detail comparing relays take a new setting which is equal to that being retained by the master comparing relays so that when contacts C6 close the equal relay E will be energized.

One or more of the relays GC (Fig. 17b) will also become energized due to the dissimilar names on the cards concurrently passing the D1 and D2 brushes during this cycle. Consequent closure of any contacts GCa will complete a circuit from line 180, contacts D6a, PSc, GCa, relay DF to ground and relay DF will close its contacts DFb to hold itself energized until contacts D6a open.

Near the end of the cycle when contacts C4 close, the circuit for magnet 43 will not be completed since contacts DFa (Fig. 17d) are open, and the magnet 40 will also not be energized. Both feeds are therefore at rest at the end of the cycle with contacts D6 and M6 maintaining the comparing relays set and the bill is complete except for the printing of the total on a later line.

Cycle 14

During this cycle the stepping magnet SM and the platen magnet 134 are energized to step arms 173, 173a to their 13 segments and space the bill to line 13.

Cycle 15

During this cycle the stepping magnet SM and platen magnet 134 are again energized to step arms 173, 173a to their 14 segments and space the bill to line 14.

Cycle 16

During this cycle the stepping magnet SM and platen magnet 134 are again energized to step arms 173, 173a to their 15 segments and space the bill to line 15. With arm 173a and its 15 segment 174a a circuit will be completed when contacts C18 close, which is traceable from line 180 (Fig. 17d), contacts C18, arm 173a, 15 segment 174a, connection 219, contacts C24 and relay R9 to ground 190.

Relay R9 shifts its contacts R9a and R9b in Fig. 17b so that when contacts C19 close, circuits are completed through all adding magnets 153 from line 180, contacts PSd, C19, contacts R9b (right) adding magnets 153 to ground. This circuit is timed so as to tend to cause ten to be added in all adding wheels so that at some time in their rotation each wheel passes from 9 to 0 and closes its carry contacts 159, 160 and at such time a circuit will be completed for each wheel traceable from line 180, contacts PSd, C21, contacts 160, 159 to socket 220, thence through a connection 221, contacts R9a (left) and print magnet 95 to print the amount standing in the accumulator wheel.

This circuit also branches at socket 220 through other contacts R9b (right) to the subtract magnets 165 which act to declutch the adding wheels in their zero or home positions, thus clearing the accumulator.

Cycle 17

During this cycle the arms 173, 173a are stepped to contact their 16 segments and the paper spaces to line 16.

Cycle 18

During this cycle arms 173, 173a advance to contact their 17 segments and the paper spaces to line 17. When contacts C18 (Fig. 17d) close a circuit is completed from line 180, contacts C18, arm 173a, 17 segment 174a, connection 222, contacts C9, relay REL to ground 190. Relay REL closes its contacts RELa to establish a holding circuit through contacts C10 and opens its contacts RELc to enable contacts C5 to break the holding circuit of relay PS near the end of the cycle.

Relay REL also closes its contacts RELb so that when contacts C11 close, the release magnet RM is energized to free the arms 173, 173a for return to their initial starting positions. When contacts C6 now close, a circuit is completed to the equal relay E since the comparing relays are set for the name Stevens for both master and detail cards.

From this point on the operations explained above are repeated for the second account sets of cards.

RECAPITULATION

Briefly reviewing the sequence of operations for a single set of cards of the same account name, the set is comprised of a master group containing three address cards and two data cards; and a detail group containing three data cards. The groups of cards are placed in their respective magazines to feed therefrom in ascending order and as they are fed there is a cross comparison between master and detail cards and a sequential comparison between successive detail cards.

Since the first cards compared are alike, i. e., both relate to the Smith account, the equal relay E is energized and this causes suspension of further detail card feeding and retention of the reading of the name taken from the first detail card, until all the master cards of the same name have been read and their data recorded and entered into the accumulator.

When the first master card of the next account identified as Stevens is read, the cross comparison results in energization of the low detail relay LD which causes suspension of the master card feeding mechanism and the machine then awaits advance of the stepping switch and bill to the preselected line. It is to be noted at this point that the two last cards in the master group, if omitted would have caused the relay LD to be energized two cycles earlier, in which case the machine would take two extra idle cycles to bring the arms 173, 173a up to the selected position for picking up the detail feed clutch magnet 43.

The detail cards now feed and the sequence comparing devices function to interrupt such feed when the last detail card of the Smith group has been read and its data recorded. The number of these detail cards may also vary and finally after the machine has spaced the bill to a preselected total line, the balance or total due is printed and the accumulator is cleared.

With the plug connection 209 (Fig. 17d) made, the cards, after having been read will be distributed with the address cards fed into pocket P2, the other two master cards in pocket P3 and the detail cards in pocket P2. It is apparent that if this connection 209 were omitted that all the cards would feed into pocket P2 to form a single file with the detail cards following the master cards.

HIGH DETAIL CONDITION

In the foregoing problem comparison of cards resulted only in an equal condition or a low detail condition. A high detail condition will result where there are no detail cards for a given group of master cards. To illustrate the operation, assume that the three Smith detail cards are not present. Then in Cycle 2 above when contacts C6 close, relay HD would be energized instead of relay E since the comparison is between Smith (master) and Stevens (detail).

As a result, the master feed clutch magnet 40 is energized through a circuit from line 180 (Fig. 17d) contacts C4, STb, wire 179, contacts HDc, PSi (right), and magnet 40 to ground 190. It will be noted that relay PS is not energized so that as the master card feeds past brushes M2 there are no reading circuits completed. In other words, where a set of account cards comprises only master cards, the master cards are passed through the machine without recording therefrom. Since, as stated, relay PS is not energized under these conditions its contacts PSh (Fig. 17d) remain open so that the stepping switches do not advance and the bill is not line spaced.

If desired, these unmatched master cards may be separated out into pocket P4 by making a plug connection 223 (Fig. 17d). In such case, when relay HD (Fig. 17c) is energized, its contacts HDb complete a circuit from line 180, contacts M4, PSg, HDb, relay H to ground 190. This relay closes its contacts Hb to provide a holding circuit through contacts M5 and also closes its contacts Ha (Fig. 17d) so that in the following cycle a circuit is completed from line 180, contacts C4, STb, wire 179, contacts Ha, connection 223, magnet S4 to ground. Magnet S4 will shift the distributing blades to guide the card to pocket P4.

LOW DETAIL CONDITION

In a similar manner if the master cards of a set are missing from the file so that when the first detail card is read there will be a low detail condition, the relay LD is energized and it in turn closes its contacts LDb to energize relay L which in turn closes its contacts Lb to provide a holding circuit through contacts D5. Then when contacts C4 close in the following cycle magnet S1 becomes energized through a circuit (Fig. 17d) from line 180, contacts C4, STb, wire 179, contacts La, connection 217 and magnet S1 to direct the detail cards into pocket P1. Concurrently, the circuit branches through contacts LDc (closed) and PSf (normal) to energize the clutch magnet 43 and cause feeding of the detail card.

The net result, therefore, is to ultimately combine sets containing both master and detail cards in pocket P2, feed unmatched master cards into pocket P4 and to feed unmatched detail cards into pocket P1. Further, any matched master cards containing the special hole 12 will be segregated in pocket P3.

It will be apparent from the foregoing that if it is desired to retain both files of cards in their original order and separate from one another, all the master cards may be perforated with the special hole 12 and plug connections 223 and 217 omitted. As a result it will then follow that all master cards will be directed into pocket P3 and all detail cards will be directed into pocket P2.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, a series of record receiving stations, means to distribute records to said stations, means to feed two separate sets of records to the distributing means, data sensing devices for each set of records, a pair of record comparing devices controlled by said sensing devices, one for comparing the records from one set with the records of the other set to ascertain the relative magnitude of the compared records, the other for comparing each record of one set with the succeeding record of the same set to ascertain whether they are alike, means controlled by the first one of said pair of comparing devices for selectively controlling the distributing and feeding means in accordance with the comparison effected by such comparing means, an accumulator, and means controlled by both said comparing devices for causing said sensing devices to enter data into said accumulator selected from both sets of records to obtain a total of data derived from related records of the two sets.

2. In a machine of the class described, having a series of record receiving stations and means for distributing records to said stations, master and detail feeding means for feeding separate sets of master and detail records to the distributing means, means to compare the master records with the detail records, means to compare each detail record with the succeeding detail record, an accumulator, sensing devices for each record, means controlled by the first comparing means for causing the master feeding means to operate continuously and for causing the related sensing device to enter data from the master records into said accumulator when master and detail records correspond, further means controlled by the first comparing means for interrupting the feeding of master records and initiating feeding of detail records and for causing the related sensing device to enter data from the detail records into said accumulator when master and detail records fail to correspond, and means controlled by said second comparing means for interrupting feeding of detail records when successive detail records fail to correspond, whereupon said accumulator will contain a total of data derived from both sets of records.

3. In a machine of the class described, means to feed a file of master records, means to feed a file of detail records, both files being arranged in a classification order, both files containing records of corresponding designations and each file also containing records for which there is no corresponding record in the other file, record comparing means for detecting the relative magnitude relationship between records in the two files, further comparing means for detecting changes of classification in one of the files, sensing devices for both files of records, an accumulator, means controlled by the first comparing means for causing the master file sensing devices to enter data into said accumulator from only those master records for which there are corresponding detail records, and means controlled by the second comparing means for causing the detail file sensing devices to enter data into said accumulator from only those detail records for which there are corresponding master records.

4. In a machine of the class described, means to feed a file of master records, means to feed a file of detail records, the records of both files containing like classification designations and variable data designations, the master records having a special designation, means for comparing the classification designations of the records in the two files, means for comparing classification designations in successive records of one of the files, a pair of receiving stations, means controlled by said comparing means for feeding first the master records and then the detail records to said receiving stations, selectively settable controls to cause both files to form a single file in one of the stations or to cause each file to enter a different station, means for sensing the records, an accumulator, and means controlled by said sensing means to enter data from the records into said accumulator as the records feed to the receiving stations, further means controlled by said sensing means and responsive to the said special designations to render the settable controls effective, whereby a total is obtained of the data in both files and the files are selectively merged into one file or kept separate.

5. In a machine of the class described, a series of record receiving stations, means to distribute records to said stations, means to feed a file of master records to the distributing means, means to feed a file of detail records, one or more records of each file corresponding to records in the other group and each file containing one or more odd records for which there is no corresponding record in the other file, means to compare the master and detail records with each other to detect relative magnitude relationships therebetween, means for sensing data designations on the records, an accumulator, means controlled by the comparing means for selectively controlling the distributing means so as to cause odd master records to be distributed to one station, odd detail records to be distributed to another station, and equal master and detail records to be distributed to a third station, and further means controlled by the comparing means to cause the sensing means to enter data into said accumulator only from the equal master and detail records.

6. In a machine of the class described, a series of record receiving stations, means to distribute records to said stations, means to feed a master set of records to said distributing means, means to feed a detail set of records to said distributing means, means to sense together data designations in a plurality of records including at least one from each set, record comparing means controlled by the sensing means, an accumulator controlled by the sensing means, said comparing means being settable under control of the sensing means according to a plurality of conditions manifesting equality and two kinds of inequality relationships between a master and a detail record, means controlled by the several settings of said comparing means for controlling the distributing means to select a common station for equal master and detail records and to select either of two other stations according to whether there is one or the other kind of inequality relationship, whereby to segregate the odd master and detail records in stations separate from each other and the equal master and secondary records, and further means controlled by said comparing means for rendering the accumulator responsive to the sensing of only equal master and detail records, whereby to obtain a total of the data contained in such equal records.

7. In a machine of the class described, a series of record receiving stations, means to distribute records to said stations, means to feed two separate sets of records to the distributing means, data sensing devices for each set of records, a pair of record comparing devices controlled by said sensing devices, one for comparing the records from one set with the records of the other set for relative magnitude, the other for comparing each record of one set with the succeeding record of the same set for equality, means controlled by the first one of said pair of comparing devices for selectively controlling the distributing and feeding means in accordance with the comparison effected by said first one of the comparing means, an entry receiving device, and means controlled by both said comparing devices for causing said sensing devices to enter data into said entry receiving device selected from both sets of records.

8. In a machine of the class described, having a series of record receiving stations and means for distributing records to said stations, master and detail feeding means for feeding separate sets of master and detail records to the distributing means, means to compare the master records with the detail records, means to compare each detail record with the succeeding detail record, an entry receiving device, sensing devices for each record, means controlled by the first comparing means for causing the master feeding means to operate continuously and for causing the related sensing device to enter data from the master records into said entry receiving device when master and detail records correspond, further means controlled by the first comparing means for interrupting the feeding of master records and initiating feeding of detail records and for causing the related sensing device to enter data from the detail records into said entry receiving device when master and detail records fail to correspond, and means controlled by said second comparing means for interrupting feeding of detail records when successive detail records fail to correspond.

9. In a machine of the class described, means to feed a file of master records, means to feed a file of detail records, both files being arranged in a classification order, both files containing records of corresponding designations and each file also containing records for which there is no corresponding record in the other file, record comparing means for detecting the relative magnitude relationship between records in the two files and separate record comparing means for detecting changes of classification in one of the files, sensing devices for both files of records, an entry receiving device, and means controlled by both said comparing means for causing the sensing devices to enter data into said entry receiving device from only those records of both files for which there are corresponding records in the two files.

10. In a machine of the class described, means to feed a file of master records, means to feed a file of detail records, the records of both files containing like classification designations and variable data designations and the master records containing a special designation, means for comparing the classification designations of the records in the two files, means for comparing classification designations in successive records of one of the files, a pair of receiving stations, means controlled by both said comparing means for feeding first the master records and then the detail records to said receiving stations, selectively settable controls, means including said settable controls to cause both files to form a single file in one of the stations or to cause each file to enter a different station, means for sensing the records, a recorder, and means controlled by said sensing means to enter data from the records into said recorder as the records feed to the receiving stations, further means controlled by said sensing means and responsive to the said special designation to render the settable controls effective whereby a record is obtained of the data in both files and the files are selectively merged into one file or kept separate.

11. In a machine of the class described, a series of record receiving stations, means to distribute records to said stations, means to feed a file of master records to the distributing means, means to feed a file of detail records, one or more records of each file corresponding to records in the other group and each file containing one or more odd records for which there is no corresponding record in the other file, means to compare the master and detail records with each other to detect relative magnitude relationships therebetween, means for sensing data designations on the records, a recorder, means controlled by the comparing means for selectively controlling said master record feeding means, said detail record feeding means and the distributing means so as to cause odd master records to be fed by the master feeding means and distributed to one station, odd detail records to be fed by the detail feeding means and distributed to another station, and equal master and detail records to be fed by their respective feeding means and distributed to a third station, and further means controlled by the comparing means to cause the sensing means to enter data into said recorder only from the equal master and retail records.

RALPH E. PAGE.
HORACE S. BEATTIE.

REFERENCES CITED

The following references are of record in the file of this patent:

UNITED STATES PATENTS

| Number | Name | Date |
|---|---|---|
| 1,710,691 | Carroll | Apr. 30, 1929 |
| 2,158,872 | Johnstone et al. | May 16, 1939 |
| 2,243,473 | Bryce | May 27, 1941 |
| 2,034,260 | Johnstone | Mar. 17, 1936 |
| 2,243,474 | Bryce | May 27, 1941 |
| 1,862,032 | Pierce | June 7, 1932 |
| 1,946,915 | Pierce | Feb. 13, 1934 |
| 2,359,670 | Page | Oct. 3, 1944 |